(12) United States Patent
Kloberdanz

(10) Patent No.: US 11,378,457 B1
(45) Date of Patent: Jul. 5, 2022

(54) HAIR COLORANT ASSESSMENT, SELECTION AND FORMULATION SYSTEM

(71) Applicant: Innovative Beauty LLC, Sheridan, WY (US)

(72) Inventor: Jesse A. Kloberdanz, Molalla, OR (US)

(73) Assignee: Innovative Beauty LLC, Sheridan, WY (US)

( * ) Notice: Subject to any disclaimer, the term of this patent is extended or adjusted under 35 U.S.C. 154(b) by 0 days.

(21) Appl. No.: 17/397,668

(22) Filed: Aug. 9, 2021

Related U.S. Application Data

(63) Continuation of application No. 17/195,073, filed on Mar. 8, 2021, now Pat. No. 11,137,291.

(51) Int. Cl.
*G01J 3/50* (2006.01)
*A45D 44/00* (2006.01)
*G01J 3/02* (2006.01)
*G01N 21/25* (2006.01)

(52) U.S. Cl.
CPC .............. *G01J 3/50* (2013.01); *A45D 44/005* (2013.01); *G01J 3/0264* (2013.01); *G01J 3/0272* (2013.01); *G01N 21/251* (2013.01); *G01N 2201/0221* (2013.01)

(58) Field of Classification Search
CPC .......... G01J 3/0264; G01J 3/50; G01N 21/25; A45D 44/005
See application file for complete search history.

(56) References Cited

U.S. PATENT DOCUMENTS

| 3,758,771 | A | 9/1973 | Frohardt et al. |
| 4,422,719 | A | 12/1983 | Orcutt |
| 4,998,186 | A | 3/1991 | Cocca |
| 5,643,341 | A | 7/1997 | Hirsh et al. |

(Continued)

FOREIGN PATENT DOCUMENTS

| CN | 2286311 Y | * | 7/1998 |
| DE | 4113454 A1 | | 12/1991 |

(Continued)

OTHER PUBLICATIONS

CLICS. Color. Creativity. Technology. Website, https://clics.com, originally downloaded Feb. 24, 2021, 3 pages.

(Continued)

*Primary Examiner* — Maurice C Smith
(74) *Attorney, Agent, or Firm* — Craig R. Miles; CR Miles P.C.

(57) ABSTRACT

A hair colorant selection and formulation system including one or more of a hair color analyzer operable to determine hair color of a hair sample and match the determined hair color to a color in a color space, a hair color selector operable in combination with a fiber optic hair sample to generate the color selected in a color space in the optical fibers of a fiber optic hair sample, and a hair colorant mixer which operates to mix a hair colorant, which can be individually, or in various combinations, operably coupled to one or more computing devices through one or more server computers via a network which supports a hair colorant selection and hair colorant formulation program accessible by the one or more computing devices.

19 Claims, 28 Drawing Sheets
(4 of 28 Drawing Sheet(s) Filed in Color)

(56) References Cited

U.S. PATENT DOCUMENTS

| | | |
|---|---|---|
| 5,963,333 A | 10/1999 | Walowit et al. |
| 6,302,570 B1 | 10/2001 | Petell et al. |
| 6,330,341 B1 * | 12/2001 | Macfarlane .......... A45D 44/005 |
| | | 382/100 |
| 6,813,568 B2 | 11/2004 | Powell et al. |
| 7,146,084 B2 | 12/2006 | Atac et al. |
| 7,270,456 B2 | 9/2007 | Bonang et al. |
| D652,167 S | 1/2012 | Bonang |
| 9,639,965 B2 | 5/2017 | Weiss |
| 9,891,109 B2 | 2/2018 | Sheridan |
| 9,977,267 B2 | 5/2018 | Grundhofer |
| 2002/0010556 A1 | 1/2002 | Marapane et al. |
| 2005/0068791 A1 | 3/2005 | Bonang et al. |
| 2005/0165705 A1 | 7/2005 | Lauper et al. |
| 2006/0000852 A1 | 1/2006 | Manne |
| 2006/0033907 A1 * | 2/2006 | Inzinna, Jr. .............. G01J 3/462 |
| | | 356/45 |
| 2007/0183633 A1 | 8/2007 | Hoffmann |
| 2008/0068604 A1 * | 3/2008 | Grassinger ........... A45D 44/005 |
| | | 356/328 |
| 2017/0156476 A1 | 6/2017 | Miklatzky et al. |
| 2019/0059560 A1 | 2/2019 | Miklatzky et al. |
| 2019/0162598 A1 | 5/2019 | Koenen |

FOREIGN PATENT DOCUMENTS

| | | | |
|---|---|---|---|
| DE | 10115503 B4 | 4/2006 | |
| WO | WO-2015166340 A2 * | 11/2015 | .......... A61B 5/1032 |

OTHER PUBLICATIONS

Amazon. Nix Mini 2 Color Sensor Colorimeter. Website, https://www.amazon.com, originally downloaded Dec. 1, 2021, 12 pages.

PCT International Patent Application No. PCT/US21/42707, International Search Report and Written Opinion of the International Searching Authority dated Dec. 13, 2021, 16 pages.

\* cited by examiner

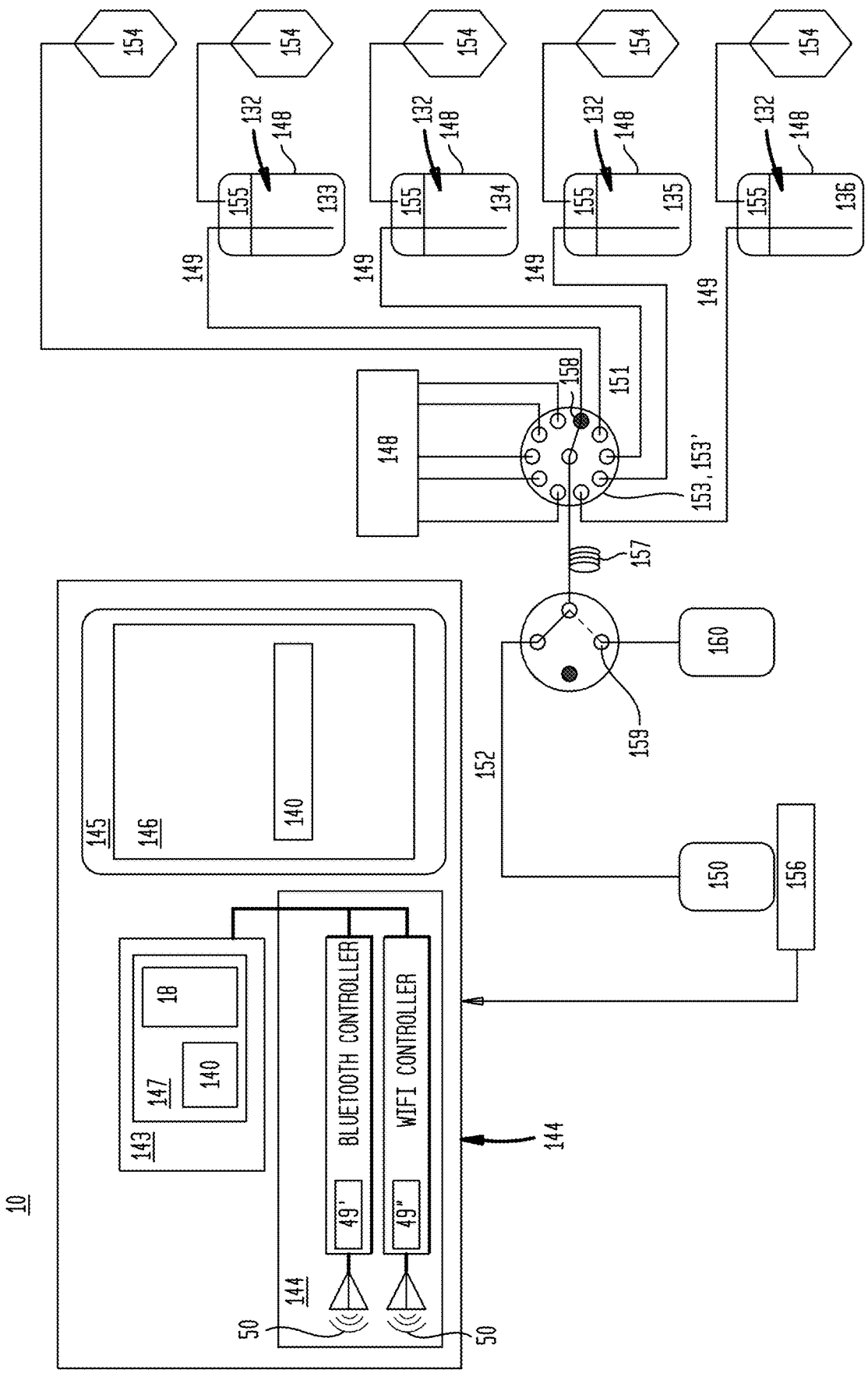

HAIR COLORANT ASSESSMENT, SELECTION AND FORMULATION SYSTEM

FIELD OF THE INVENTION

A hair colorant selection and formulation system including one or more of a hair color analyzer operable to determine hair color of a hair sample and match the determined hair color to a color in a color space, a hair color selector operable in combination with a fiber optic hair sample to generate the color selected in a color space in the optical fibers of a fiber optic hair sample, and a hair colorant mixer which operates to mix a hair colorant, which can be individually, or in various combinations, operably coupled to one or more computing devices through one or more server computers via a network which supports a hair colorant selection and hair colorant formulation program accessible by the one or more computing devices.

SUMMARY OF THE INVENTION

A broad object of particular embodiments of the invention can be to provide a system and method of using in a system one or more of a hair color analyzer operable to determine hair color of a hair sample and match the determined hair color to a color in a color space, a hair color selector operable in combination with a fiber optic hair sample to generate the color selected in a color space in the optical fibers of a fiber optic hair sample, and a hair colorant mixer which operates to mix a hair colorant, which can be individually, or in various combinations, operably coupled to one or more computing devices through one or more server computers via a network which supports a hair colorant selection and hair colorant formulation program accessible by the one or more computing devices.

Another broad object of particular embodiments of the invention can be to provide a hair analyzer and methods of making and using a hair analyzer including at least one light emitter which emits visible light reflected by a shell having a reflective interior surface extending to a shell outer edge which connects to an annular base having an annular base inner edge defining an optical aperture about which an optical tube extends and delivers the visible light onto a hair sample at an angle theta, whereby light reflected from the substrate passes through a light receiving tube to a first color detector to detect said visible light reflected from said substrate. A controller responsive to user actuation operates the at least one light emitter driver circuit to control emission of the visible light from the at least one light emitter, and receives and converts color data generated by the first color detector to a color in a color space to provide an analyzed hair color.

Another broad object of the invention can be to provide a hair color selector and methods of making and using a hair color selector including at least one light emitter configured to emit a visible light having a color selected by a user in a color space through an optical tube to allow viewing of a selected hair color by the user. In particular embodiments, the optical tube can be configured to receive a fiber optic hair sample, wherein said visible light incident upon said fiber optic hair sample travels through an optical fiber bundle to illuminate the optic fiber bundle at the selected hair color.

Another broad object of the invention can be to provide a fiber optic hair sample and methods of making and using a fiber optic hair sample including an optical fiber bundle including a plurality of optical fibers which can resemble hair and an optical fiber bundle holder having an internal surface configured to hold the optical fiber bundle and an external surface configured to engage a hair color selector including at least one light emitter configured to emit a visible light of a selected hair color, wherein said visible light incident upon said fiber optic hair sample travels through an optical fiber bundle to illuminate the optic fiber bundle at the selected hair color.

Another broad object of the invention can be to provide a hair colorant mixer and methods of making and using a hair colorant mixer including a plurality of vessels each configured to contain one of a plurality of hair colorant constituents, the hair colorant constituents including one or more of: a primary intermediate, a coupler, an oxidizing agent, and an alkalinizing agent, and combinations thereof, which can be delivered to a collection container through a conduit defining a flow path between each of the plurality of vessels and the collection container, wherein the conduit includes one or more vessel valves switchable between a valve closed condition interrupting delivery of said hair colorant constituent through said flow path and an open condition allowing delivery of a hair colorant constituent through said flow path from a vessel to the collection container, and a hair colorant mixer controller responsive to a hair colorant formula to operate the one or more vessel valves to deliver each the hair colorant constituents based on the hair colorant formula to the collection container to produce a hair colorant which combined with a hair color of user results in a selected hair color selected by the user.

Another broad object of the invention can be to provide a non-transitory computer readable medium containing a program code executable to generate a hair colorant formula of a hair colorant based on color data associated with an analyzed hair color of a hair sample of a user and a selected hair color of the user, wherein the program code functions to determine a ratio of underlying pigments associated with said analyzed hair color and correlates the ratio of underlying pigments of the analyzed hair color to a ratio of primary intermediates and a ratio of couplers in a hair colorant which upon reaction and in combination with the ratio of underlying pigments associated with said analyzed hair color results in the user selected hair color, and can further function to determine a level of difference between the analyzed hair color and the selected hair color, and thereafter, correlates the level of difference to a concentration of an oxidizing agent to admix with said ratio of primary intermediates and said ratio of couplers in said hair colorant, and to a concentration of an alkalinizing agent in said hair colorant containing the concentration of oxidizing agent and the ratio of primary intermediates and the ratio of couplers to achieve a neutral or alkaline pH of said hair colorant, and can further function to determine the concentration of the alkalinizing agent in the hair colorant to alter a penetration level of the hair colorant in the hair, and to determine the concentration of the alkalinizing agent in the hair colorant to achieve a hair pigment removal level of the underlying hair pigments from said hair.

Naturally, further objects of the invention are disclosed throughout other areas of the specification, drawings, photographs, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 33 is a block flow diagram of a particular embodiment of a hair colorant mixer.

DETAILED DESCRIPTION OF THE INVENTION

Figure 1:
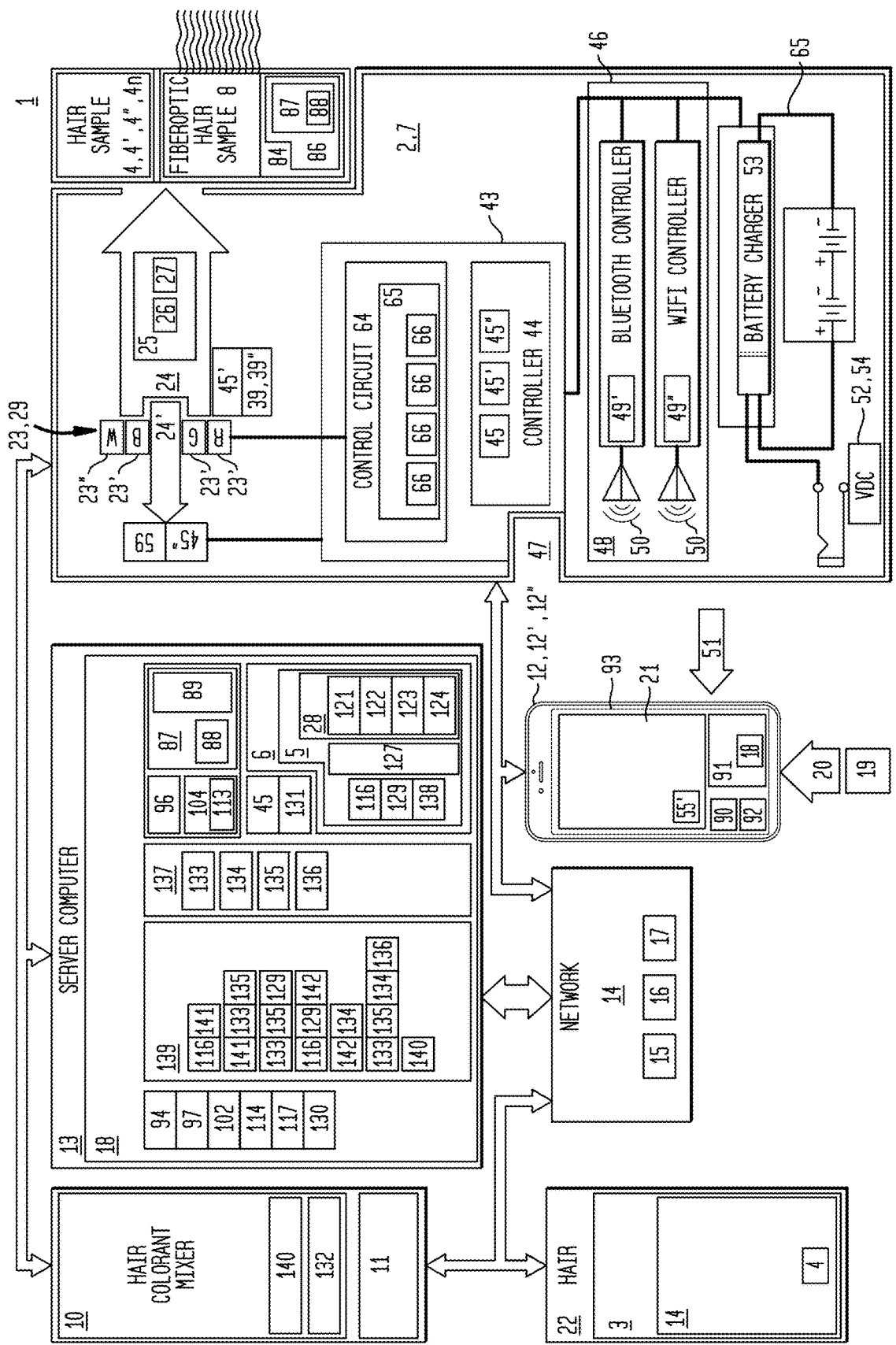
FIG. 1 is a block diagram of an illustrative computer means, network means and computer-readable media which provides computer-executable instructions to implement an embodiment of and a method of using the system.

Generally, with reference to FIGS. 1 through 33, the invention relates to a hair colorant selection and formulation system (1) (also referred to as the "system") which can include one or more of: a hair color analyzer (2) operable to determine hair color (3) of a hair sample (4) and match the determined hair color (3) to a color (5) in a color space (6), a hair color selector (7) operable in combination with a fiber optic hair sample (8) to generate the color (5) selected in a color space (6) in the optical fibers (9) of a fiber optic hair sample (8), and a hair colorant mixer (10) which operates to mix a hair colorant (11), which can be individually, or in various combinations, operably coupled to one or more computing devices (12) through one or more server computers (13) via a public network (14) such as the Internet (15), a cellular-based wireless network(s) (16), or a local network (17) (individually or collectively the "network (13)"). The network (14) supports a hair colorant selection and hair colorant formulation program (18) (also referred to as the "program (18)") accessible by browser based on-line processing or downloadable by the one or more computing devices (12). The program (18) coordinates communication between the one or more computing devices (12) to establish on-line or off-line wired or wireless connection with one or more of the hair color analyzer (2), the hair color selector (7), and the hair colorant mixer (10) to allow a user (19), by user indications (20) in a graphical user interface (21), to perform a method including: analyzing hair color (3) of a hair sample (4), selecting a hair color (3) as a color (5) in a color space (6), generating color (5) in the optical fibers (9) of a fiber optic hair sample (8), formulating a hair colorant (11); mixing a hair colorant (11) by operation of the hair colorant mixer (10), obtaining the hair colorant (11) from the hair colorant mixer (10); and applying the hair colorant (11) to the hair (22) resulting in a change in the hair color (3) to accurately match the color (5) selected by the user (19) by user indications (20) in the color space (6) depicted on the graphical user interface (21).

Figure 9:
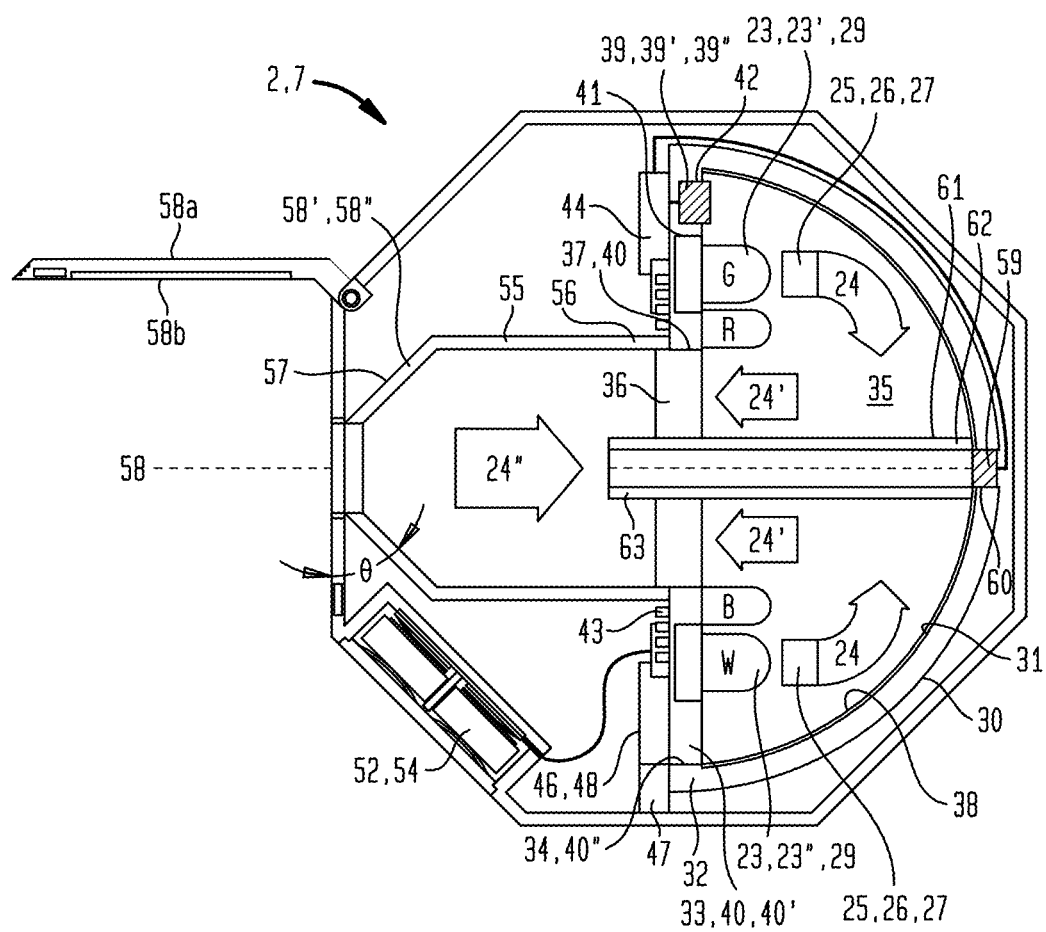
FIG. 9 is a cross section view 9-9 of the particular embodiment of the hair color analyzer depicted in FIG. 2.
Figure 10:
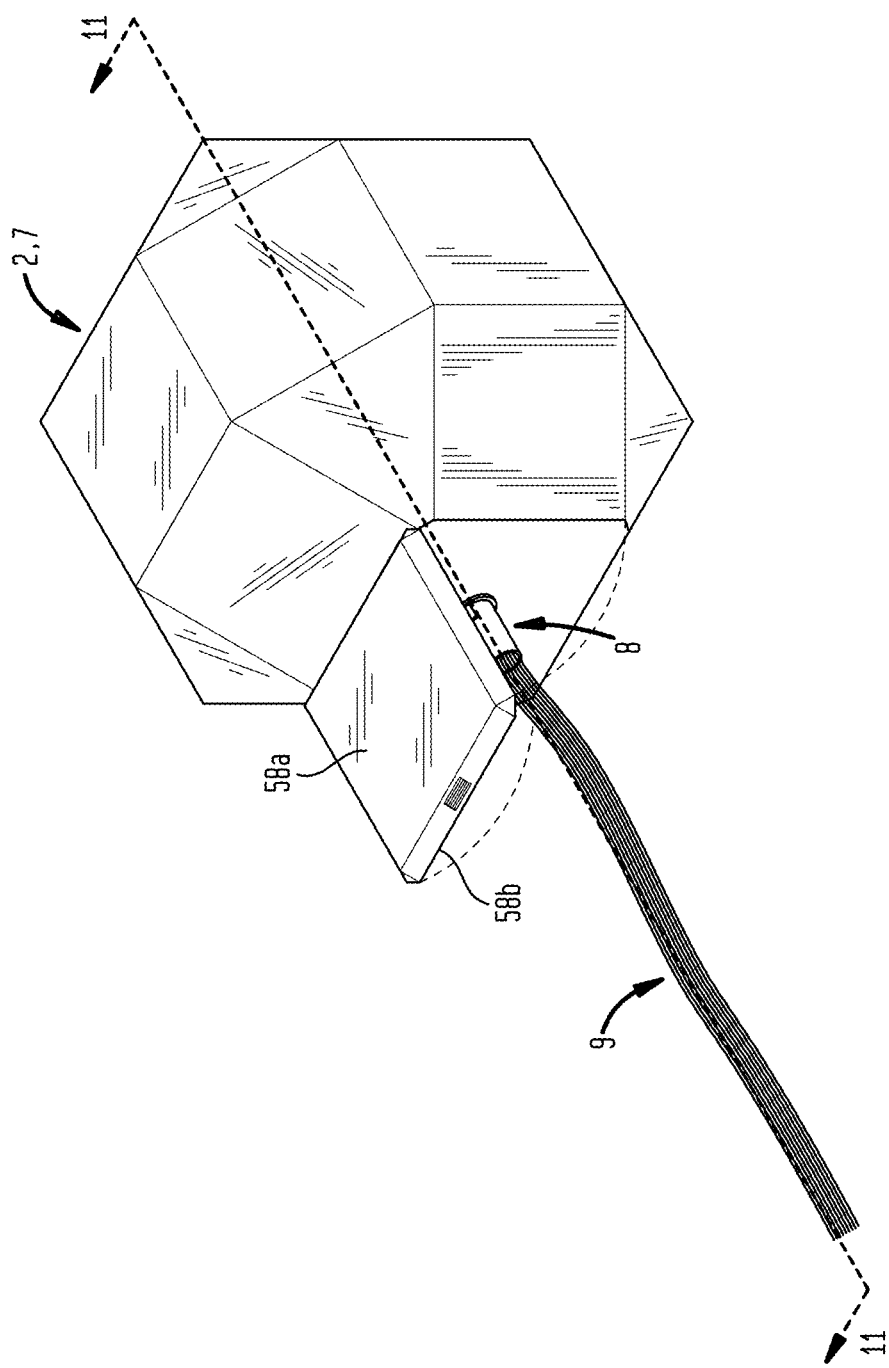
FIG. 10 is a perspective view of an embodiment a hair color selector having a closure which operates between an open condition to receive a fiber optic hair sample and a closed condition.
Figure 11:
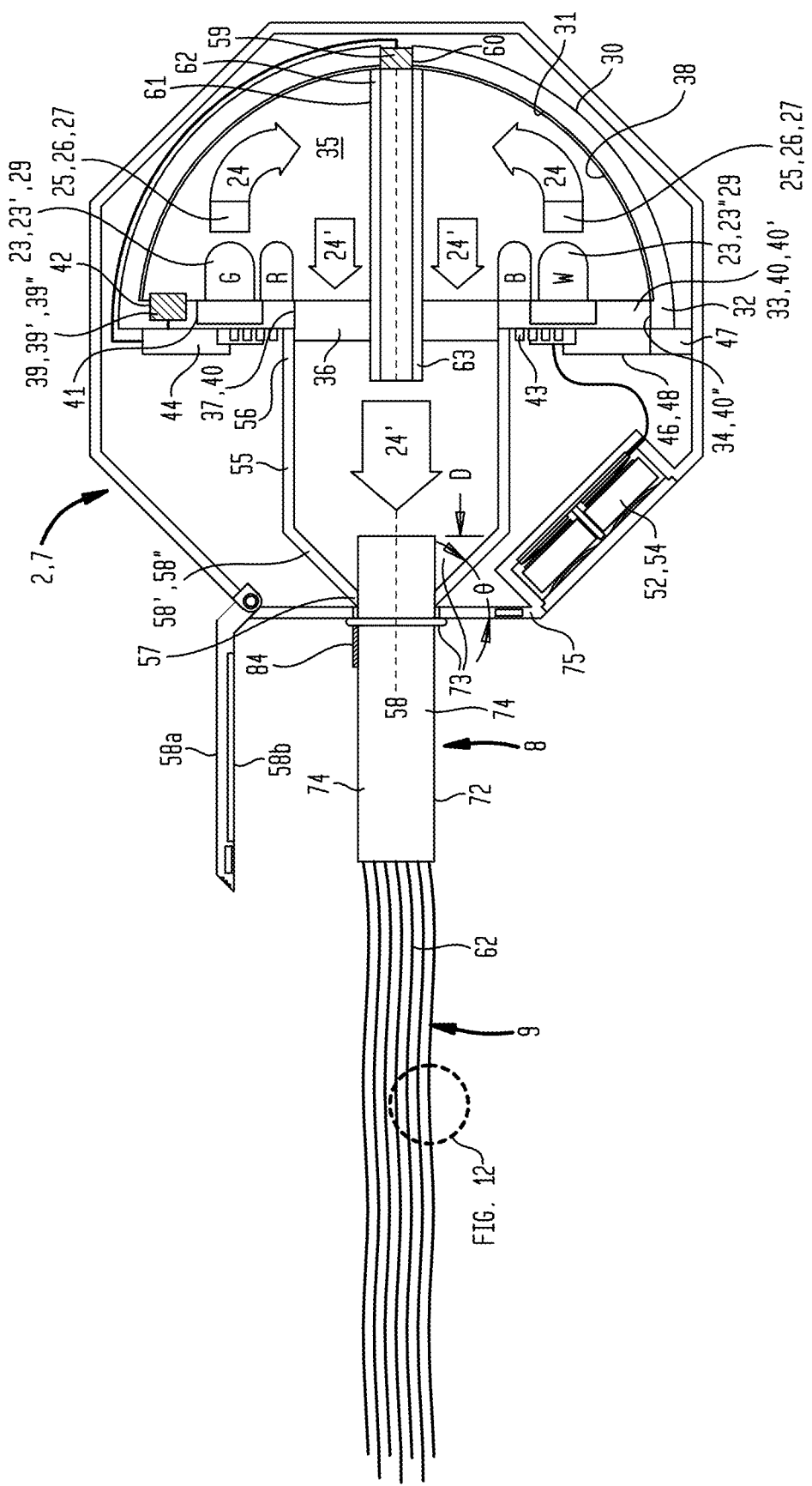
FIG. 11 is a cross section view 11-11 of the hair color selector depicted in FIG. 10.

Now with primary reference to FIGS. 1 and 2 through 11, embodiments of the invention can include a hair color analyzer (2) (as shown in the example of FIGS. 2 through 9) and a hair color selector (7) (as shown in FIGS. 10 through 11) which can comprise discrete devices or comprise an integrated unit (2, 7) (as shown in the example of FIGS. 1 and 11).

The integrated unit (2, 7) can include a light emitter (23) operable to emit light (24) within a pre-determined segment, or user selected segment, of the electromagnetic spectrum (25), or at one or more pre-determined or user selected wavelength frequencies (26) or wavelength amplitudes (27) to illuminate a hair sample (4) for analysis of hair color (3) or illuminate a fiber optic hair sample (8) to generate a color (5) in the optical fibers (9) selected within a color space (6). Typically, the segment of the electromagnetic spectrum (25) will occur in the visible spectrum (VS) that is visible to the human eye. The emitted light (24) can have one or more pre-determined or user selected wavelength frequencies (26) or wavelength amplitudes (27) occurring in the range of about 380 nanometers to about 750 nanometers; however, this does not preclude embodiments in which the pre-determined wavelength frequencies (26) occur outside of the visible spectrum (VS) such as near ultraviolet (NUV), ultraviolet (UV), near infrared (NIR), and infrared (IR), or combinations of wavelength frequencies (26) inside and outside of the visible spectrum (VS). The emitted light (24) can be used to illuminate hair samples (4) for analysis of hair color (3) or to illuminate a fiber optic hair sample (8) to generate in the optical fibers (9) a color (5) selected in a color space (6), the color space (6) including as examples: RGB color space (for example, in hexadecimal format), HSL color space, CIE 1931 XYZ color space which may be converted into HTML, CMYK, or PANTONE® units. Color attributes (28) of the emitted light (24) can be adjusted, the color attributes (28) including any primary color (red, green, or blue), any combination of two primary colors, or adjustment to the primary colors, or combinations of primary colors, including adjustment of brightness, saturation, hue, tint, tone, or shade, and combinations thereof.

Now, with primary reference to FIGS. 1 and 2 through 11, the hair color analyzer (2), the hair color selector (7) or the integrated unit (2, 7) includes at least one light emitter (23) adapted to emit light (24) within the predetermined or selected segment of the electromagnetic spectrum (25), or at one or more pre-determined or user selected wavelength frequencies (26) or wavelength amplitudes (27). In particular embodiments, the light emitter (23) can be a solid-state light emitting element formed from organic or inorganic semiconductor materials. As illustrative examples, the light emitter (23) can be a light emitting diode ("LED")(29) including all types of semiconductor diode devices that are capable of receiving an electrical signal and producing a responsive output of electromagnetic energy. Thus, the term "LED" should be understood to include light emitting diodes (29) of all types, light emitting polymers, organic diodes, and the like; however, the illustrative example of the use of LED light emitters is not intended to preclude other types of light emitters adapted for, capable of, or configured to emit light (24) within the predetermined or selected segment of the electromagnetic spectrum (25).

In the illustrative example of FIG. 9, the integrated unit (2, 7) can, but need not necessarily, include a light emission integration shell (30) having a reflective interior surface (31) extending to a shell outer edge (32) and an annular base (33). An annular base outer edge (34) can join to the shell outer edge (32) defining a shell interior space (35) having an optical aperture (36) defined by an annular base inner edge (37). Depending on the embodiment, the annular base (33) can carry one or a plurality of light emitters (23). As one illustrative example, the annular base (33) can carry a plurality of controllable LED light emitters (29) (red (R), green (G) and blue (B)), or controllable LED light emitters (29) emitting a full or broad spectrum of visible light inclusive of all the wavelengths of visible spectrum (VS). In an integrated unit (2, 7), the plurality of light emitters (23) can include both controllable LED (29) RGB light emitters (23') and LED (29) full or broad-spectrum light emitters (23"). The one or the plurality of light emitters (23) mounted on the annular base (33) can emit light (24) onto the reflective interior surface (31) of the light emission integration shell (30). The color attributes (28) of the emitted light (24) relate to the emitted wavelength frequencies (26) and wavelength amplitude (27). The emitted light (24) from the one or plurality of light emitters (23) can be diffusely reflected and combined within light emission integration shell (30) to form an integrated light (24') for emission through the optical aperture (36). Such integration, for example, may combine light from a plurality of light emitters (23) to form a relatively Lambertian distribution across the optical aperture (36) with the visible intensity spread substantially uniformly across the optical aperture (36), rather than exhibiting pixilation.

At least a portion of the reflective interior surface (31) of the light emission integration shell (30) can exhibit a diffuse reflectivity of the integrated light (24') from the one or the plurality of light emitters (23) directed through the optical aperture (36). The reflective interior surface (31) of the light emission integration shell (30) can be any of a wide variety of configurations adapted to diffuse the emitted light (24) and reflect the diffused and reflected emitted light (24) as integrated light (24') through the optical aperture (36). The illustrative example of FIG. 9, depicts a cross-section of an embodiment of an integrated unit (2, 7) including a light emission integration shell (30) having a hemispherical or semi-cylindrical reflective interior surface (31) which diffuses and reflects the emitted light (24) through the optical aperture (36). Regardless of the configuration of the reflective interior surface (31) which may vary to integrate and reflect the emitted light (24) through the optical aperture (36), it may be desirable that the reflective interior surface have a highly efficient reflective characteristic (a reflectivity equal to or greater than 90%) with respect to the predetermined or selected segment of the electromagnetic spectrum (25). In particular embodiments, the entire reflective interior surface (31) can be diffusely reflective, or one or more portions may be diffusely reflective while other portion(s) of the reflective interior reflective surface (31) may afford specular reflection. In particular embodiments, the light emission integration shell (30) can be formed of a diffusely reflective plastic material, such as a polypropylene or polystyrene plastic having both reflective and diffuse reflective properties. Alternatively, the reflective interior surface (31) can comprise a rigid substrate with a diffusely reflective coating layer (38) to provide the diffusely reflective interior surface (31) of the light emission integration shell (30). The reflective coating layer (38), can for example, comprise a flat-white paint or white powder coat. Light from each light emitter (23) diffusely reflects at least once inside the light emission integration shell (30) before emission as part of the integrated light (24') that emerges through the optical aperture (36).

Again, with primary reference to FIG. 9, in particular embodiments, the annular base (33) can further carry a first color detector (39) to detect the color attributes (28) of the emitted light (24) or integrated light (24') diffusely reflected from within the shell interior space (35) of the light emission integration shell (30). The first color detector (39) can detect color attributes (28) of the integrated light (24') in the light emission integration shell (30). As an illustrative example, the first color detector (39) can be an RGB color detector (39'). The RGB color detector (39') can include an array of photodiodes with a portion of the photodiodes having blue filters, a portion having green filters, a portion having red filters and a portion having no filter which detects white light. The first color detector (39) can in the alternative be a true color sensor (39") suitable for use with broad spectrum white light emitters (23").

In particular embodiments, the annular base (33) can engage or comprise a printed circuit board ("PCB") (40). The PCB (40) can have one or a plurality of light emitter openings (41) which receive a corresponding one or plurality of light emitters (23), such as LEDs (29), and can have one or a plurality of color detector openings (42) which correspondingly receive the one or more color detectors (39)(39')(39"), such as the first color detector (39). In particular embodiments, the PCB (40) can comprise an annular PCB (40') having a PCB outer annular edge (40") mounted to the shell outer edge (32) of the light emission integration shell (30) and a PCB inner annular edge (40''') defining the optical aperture (36). The PCB (40) includes an integrated circuit (43) including a controller (44) responsive to color data (45) generated by the program (18) in response to pre-determined or selected color attributes (28) and responsive to a first detector signal (45') generated by the first color detector(s) (39) to detected color attributes (28) of the diffusedly reflected integrated light (24') within the shell interior space (35) of the light emission integration shell (30). The controller (44) can convert the first detector signal (45') to color data (45) and controls an electronic data exchanger (46) to exchange color calibration data (47) and color data (45) with a server computer (13) or computing device (12). The electronic data exchanger (46) can be in the form of a universal serial bus (47), or a wireless radio frequency transmitter (48) to afford wired or wireless connection or pairing of the controller (44) with one or a plurality of computing devices (12) over a short-range radio frequency band (49) to carry a signal (50) over all or a part of a communication path (51) between the hair color analyzer (2), a hair color selector (7), or the integrated unit (2, 7) and the computing device (12). The short-range frequency band (49) can include as illustrative examples: BLUETOOTH® (49') which operates at frequencies of about 2402 MHz to about 2480 MHz or about 2400 MHz to about 2483.5 MHz or WI-FI® (49") which operates at about 2.4 GHz or 5 GHz. The controller (44) can also govern power management to measure and allocate voltages of a power source (52). In particular embodiments, a battery charging circuit (53) can be coupled to a battery (54), such as, a 5 Volt ("V") battery, a 9 V battery or 12 V battery (or 110 Volt alternating current transformed to direct current to operate the hair color analyzer (2), the hair color selector (7), the integrated unit (2, 7), or charge the battery (54)). The controller (44) in coordination with the electronic data exchanger (46) can further operate to transmit a battery status notification (55') to the computing device (12).

Now, with primary reference to FIGS. 1, 9 and 11, the hair color analyzer (2), the hair color selector (7), or the integrated unit (2, 7), can further include an optical tube (55) having an optical tube first end (56) disposed about and extending outward from the annular base inner edge (37) (or PCB inner annular edge (40''')) and away from the reflective interior surface (31) to terminate in an optical tube second end (57). While the embodiments shown in the Figures dispose the optical tube longitudinal axis (58) in substantially orthogonal relation to the annular base (33), this is not intended to preclude embodiments in which the optical tube (55) extends at other angles to the annular base (33). Emitted light (24) diffusedly reflected by the reflective interior surface (31) passes through the optical aperture (36) and through the optical tube (55) to be emitted from the optical tube second end (57). Emitted light (24) including a full or broad spectrum of visible light (23") can be used to illuminate a hair sample (4) for hair color analysis or to illuminate a fiber optic hair sample (8) to generate color (5) in the optical fibers (9). In particular embodiments, the optical tube (55) can be configured to direct the emitted light (24) at the optical tube second end (57) in an angular relationship theta (θ) to a hair sample (4) or the fiber optic hair sample (8). The angular relationship theta (θ) can result in illumination of the hair sample (4) or the fiber optic hair sample (8) at an angle in a range of about 400 to about 50°, and in particular embodiments close to 45° within the range, or at 45°. In particular embodiments, the optical tube (55) proximate the optical tube second end (57) can in part include one or more angled sidewall(s) (58), as an illustrative example, an optical tube part (58') proximate the optical tube second end (57) can formed as a truncated cone (58") to reflect the emitted light (34) passing through optical tube (55) at an angle (θ) to the optical tube longitudinal axis (58) to direct the emitted light (24) in angular relationship theta (θ) to the hair sample (4) or the fiber optic hair sample (8). The optical tube second end (57), can, but need not necessarily include an optical tube closure (58a) which can operate to hold the hair sample (4) proximate the optical tube second end (57). The optical tube closure (58a) can include closure reflective layer (58b) which can comprise a flat-white paint or white powder coat.

Now, with primary reference to FIGS. 1 and 9, particular embodiments of the hair color analyzer (2) or the integrated unit (2, 7) can further include a second color detector (59) disposed in a second color detector opening (60) located in the light emission integration shell (30) opposite the optical aperture (36). Typically, the second color detector (59) will be disposed in the second color detector opening (60) will substantially align with the central optical tube longitudinal axis (58). A reflected light receiving tube (61) can have a light receiving tube first end (62) disposed about the second color sensor opening (60) and outwardly extending away from the reflective interior surface (31) to terminate in a light receiving tube second end (63) disposed within the optical aperture (36) or within the optical tube (55). A portion of a full spectrum emitted light (W) reflected from the hair sample (4) disposed at or proximate the optical tube second end (57) can pass through the light receiving tube (61) to the second color detector (59). The second color detector (59) can operate to receive reflected light (24") from the illuminated hair sample (4) and to generate a second detector signal (45") which varies based on the color attributes (28) of the reflected light (24"). The second detector signal (45") can be received by the controller (44) and converted to color data (45) which can be transmitted by the electronic data exchanger (46) to the server computer (13) or a computing device (12) and by operation of the program (18) the color data (45) can be converted to a color (5) in the color space (6). The hair color (3) of the hair sample (4) can be depicted in the graphical user interface (21) of the computing device (12). The hair color (3) determined by the hair color analyzer (2) can be achieved automatically with a repeatable accuracy and precision that cannot be made by visualization and matching to a color (5) in the color space (6) because each person may attribute different color attributes (28) to the same hair sample (4)(due to environmental conditions surrounding a user (19) or eyesight of a user (19)), while the hair color analyzer (2) can determine for the same hair sample (4) the same color (5) whether within the same color space (6) or correlated between different color spaces (6) regardless of the environmental conditions or which one of a plurality of users (19) operate the hair color analyzer (2).

Again, with primary reference to FIGS. 1, 9 and 11, particular embodiments of the hair color selector (7) or the integrated unit (2, 7) can further include a control circuit (64) electrically coupled to the light emitter(s) (24) operable to adjust emitted light color attributes (28). The control circuit (64) typically includes a power source circuit (65) coupled to the power source (52). The control circuit (64) also includes an appropriate number of light emitter driver circuits (66) for controlling the power applied to each of the different light emitters (23), and thus the wavelength amplitude (27) for each different wavelength frequency (26). In the example of LEDs (29), the amount of power supplied to each of a plurality of LED driver circuits (66) controls of the intensity of emission of the corresponding LEDs (29) to establish the color attributes (28) of the emitted light (24) from each LED (29) and thus the color attributes (28) of the diffusedly reflected integrated light (24') passing through the optical aperture (36) and through the optical tube (55). In the illustrative example, the wavelength frequencies (26) of the emitted light (24) comprise the emitted light (24) from one or more LEDs (29). One or more LEDs (29) can emit light (24) of a first color (5'), and one or more LEDs (29) can emit light of a second color (5"), wherein the second color (5") is different from the first color (5'). Similarly, one or more LEDs (29) can emit light of a third color (5'''), a fourth color . . . color$_n$. To achieve the highest color rendering index (CRI), the LEDs (29) may include LEDs (29) of various wavelength frequencies (26) that cover virtually the entire visible spectrum (VS). For example, arbitrary pairs of the LEDs (29) might emit four different colors of light R, G, B as primary colors and a fourth color chosen to provide an increased variability of the color attributes (28) of the integrated light (24'). One or more white light emitters (23"), such as white LEDs, may also be included.

The control circuit (64) controls the power provided to each of the LEDs (29). The reflective interior surface (31) effectively combines the energy of different wavelength frequencies (26) and wavelength amplitudes (27), from the various LEDs (29) and the integrated light (24') can be emitted through the optical aperture (36). Control of the intensity of light emitters by the control circuit (64) establishes the color attributes (28) (spectral characteristics) of the integrated light (24') through the optical aperture (36) and the optical tube (55). The first color detector (39) can detect color attributes (28) in the integrated light (24') within the shell interior space (35) of the light emission integration shell (30). The first color detector (39) can generate a first detector signal (45') which can be converted to color data (45) by the controller (44) and transmitted by the electronic data exchanger (46) to the server computer (13) or computing device (12) and converted to a color (5) in the color space (6). The program (18) can further function to compare the color attributes (28) of the integrated light (24') within the shell interior space (35) of the light emission integration shell (30) to a color (5) selected by the user (19) by user indications (20) in the color space (6) depicted on the graphical user interface (21). Thus, the hair color selector (7) can generate integrated light (24') at or proximate the optical tube second end (57) have color attributes (28) to which substantially match or match the color attributes (28) of a color (5) selected by user indications (20) in a color space (6) depicted in the graphical user interface (21) on a computing device (12).

Now, with primary reference to FIGS. 10 through 20, fiber optic hair sample (8) can include a plurality of optical fibers (9). In particular embodiments, the plurality of optical fibers (9) ranges from about five optical fibers (9) to about one hundred optical fibers (9); although a greater lesser number of optical fibers (9) can be included depending on the embodiment. The optical fibers (9) within the plurality of optical fibers (9), while typically being of equal length can be of unequal length. The plurality of optical fibers (9) can be disposed in an optical fiber bundle (67). Each of the optical fiber bundles (67) can have a bundle proximal end (68) formed by optical fiber first ends (69) of the plurality of optical fibers (9), a bundle distal end (70) formed by the optical fiber second ends (71) of the plurality of optical fibers (9), and a bundle longitudinal length (71) disposed between optical fiber first and second ends (69)(71). The bundle proximal end (68) can be securely mounted in a bundle holder (72) to produce the optical hair sample (8). The bundle proximal end (68) can be disposed within optical tube (55) of the hair color selector (7) or integrated device (2, 7) to allow the diffusedly reflected integrated light (24') passing through the optical aperture (36) from the light emission integration shell (30) to be to be incident upon the bundle proximal end (68) and transmitted to the bundle distal end (70) along the longitudinal length of the optical fibers (9). The bundle proximal end (68) can be disposed at a distance (L) from the reflective interior surface (31) of the light emission integration shell (30) such that the diffusedly reflected integrated light (24') can be optimally collected at the bundle proximal end (68) and transmitted through the optical fibers (9) toward the bundle distal end (70). In particular embodiments, the bundle holder (72) can be configured to insert into the optical tube second end (57). The bundle holder (72) can be further configured to dispose the bundle proximal end (68) at the distance (D) from the reflective interior surface (31). In particular embodiments, the bundle holder (72) can further include bundle stop (73) on the bundle holder external surface (74). The bundle stop (73) can be disposed on the bundle holder external surface (74) to abut the hair color selector external surface (75) or the integrated unit external surface (2, 7, 75) to dispose the bundle proximal end (68) at the distance (D) from the reflective interior surface (31).

In the example depicted by FIGS. 13 through 20, the bundle holder (72) has a cylindrical internal surface (76), and a cylindrical external surface (77) with the bundle stop (73) configured as an annular bundle stop (73') extending circumferentially and radially outward of the bundle holder external surface (74). In particular embodiments, the bundle holder (72) configured as a cylinder can have an external diameter in the range about one quarter of an inch (about 6.3 millimeters ("mm")) to about one half of an inch (about 12.7 mm) and an internal diameter of about three sixteenths inch (about 4.6 mm) to about three eighths inch (about 9 mm). The optical tube second end (57) can have a configuration to receive the bundle holder (72) with the bundle stop (73) abutting the hair selector external surface (75) or the integrated unit external surface (2, 7, 75) to reduce light emission through the unfilled space between the optical tube second end (57) and the bundle holder (72). However, the illustrative example shown in the Figures is not intended to preclude embodiments of the optical hair sample (4) or bundle holder (72) or the optical fiber bundle (67) having different configurations that can be engaged with the optical tube (55) to deliver the integrated light (24') on the bundle proximal end (68), such as: a truncated pyramid, a truncated cone, a square, a rectangular, an oval, lozenge, or the like.

Figure 12:
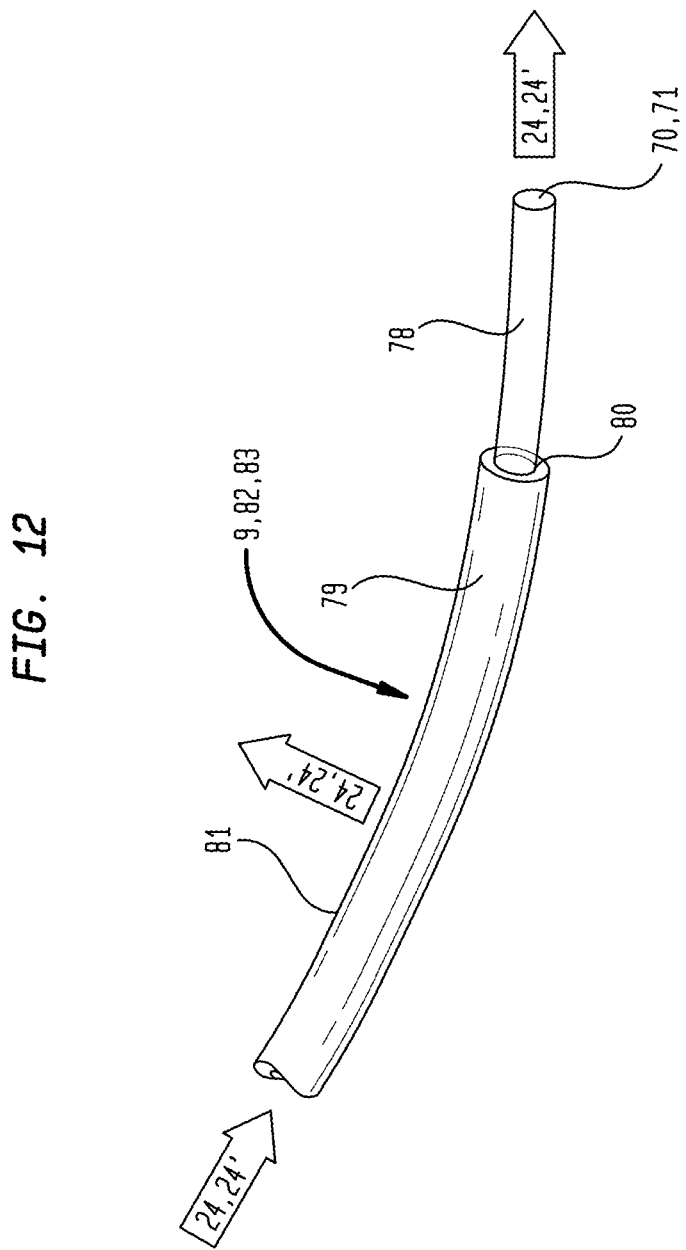
FIG. 12 is an enlarged portion of as shown in FIG. 11 which depicts a portion of an optical fiber.
Figure 13:
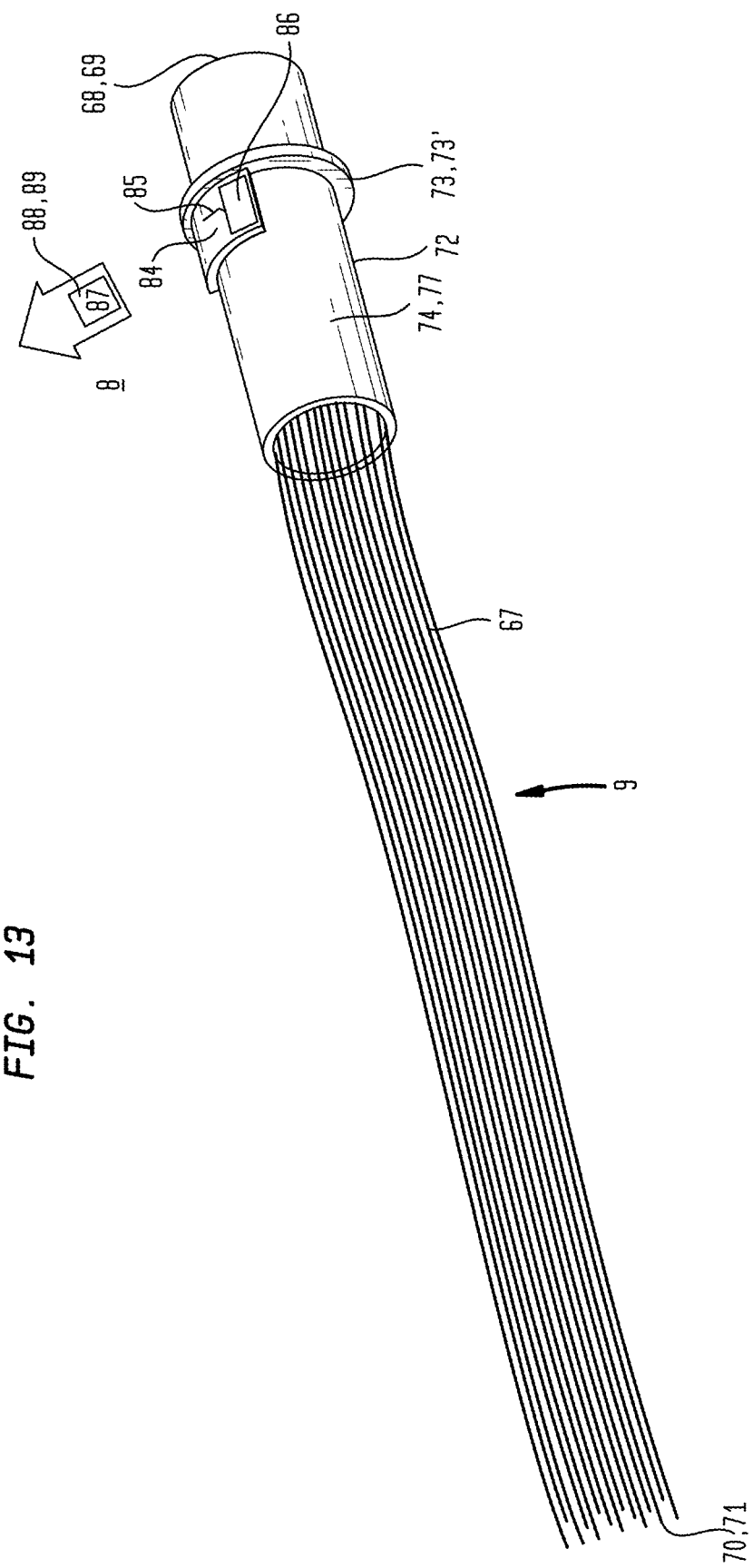
FIG. 13 is a perspective view of a particular embodiment of a fiber optic hair sample.
Figure 14:
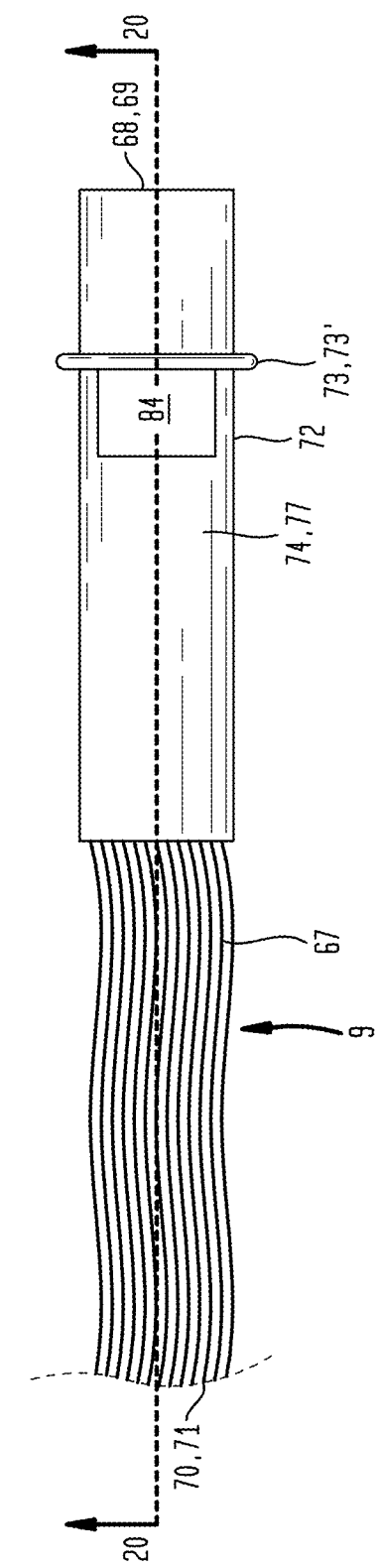
FIG. 14 is a first side elevation view of the particular embodiment of the fiber optic hair sample.
Figure 15:
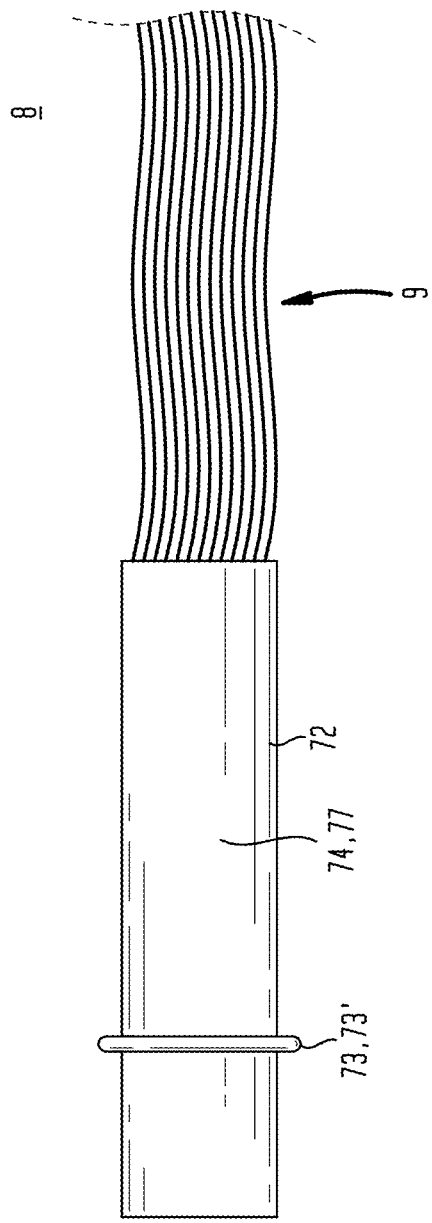
FIG. 15 is a second side elevation view of the particular embodiment of the fiber optic hair sample.
Figure 16:
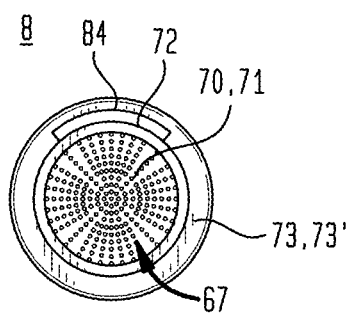
FIG. 16 is a first end view of the particular embodiment of the fiber optic hair sample.
Figure 17:
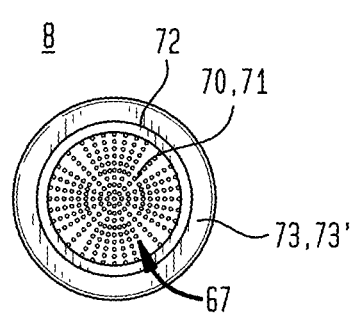
FIG. 17 is a second end view of the particular embodiment of the fiber optic hair sample.
Figure 18:
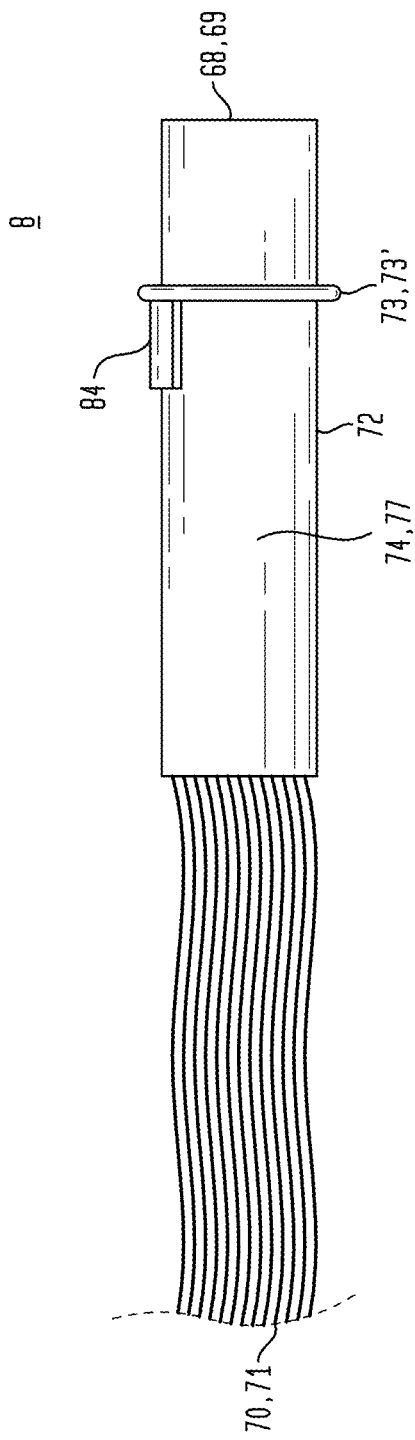
FIG. 18 is a third side elevation view of the particular embodiment of the fiber optic hair sample.

Now, with primary reference to FIG. 12, the optical fiber (9) or each of the plurality of optical fibers (9) in the optical fiber bundle (67) can comprise a flexible transparent cylindrical core (78) of glass or plastic surrounded by a flexible transparent or translucent clad (79) having a lower index of refraction than the core (78). The integrated light (24') incident on the bundle proximal end (68) can travels through the core (78) due to internal reflection at the core-clad boundary (80). The internal reflection at the core-clad boundary (80) can comprise a total internal reflection in which substantially all the integrated light (24') received at the bundle proximal end (68) can be emitted at the bundle distal end (70), partial internal reflection in which a portion of the integrated light (24') received at the bundle proximal end (68) can be emitted through the optical fiber side (81) and a portion of the integrated light (24') can be emitted at the bundle distal end (70), or substantially all of the integrated light (24') received at the bundle proximal end (68) can be emitted through the optical fiber side (81). Emission of the integrated light (24') through the optical fiber side (81) can be greater or lesser depending upon the refractive index of the core (78) relative to the clad (79). For example, the core (78) can have a refractive index larger than that of the clad (79) (such as 0.01 to 0.2). If the refractive index is smaller than this, the internal reflection of integrated light (24') may be insufficient at the core-cladding boundary (80) to function as a side-emission optical fiber (82). If the refractive index is larger than this, the reflection at the of integrated light (24') may be too great at the core-cladding boundary (80) and the integrated light (24') may not propagate to the bundle distal end (70) and the reflection may be to great to function as an end-emission optical fiber (83). Additionally, the core (78) can taper between the optical fiber first end (69) and the optical fiber second end (71) while the clad (79) can maintain a substantially constant outer diameter. Here, the appropriate refractive index can be calculated by combining the angle and the refractive index of the taper portion of the optical fiber (9) depending on the amount of integrated light (24') to be emitted from the optical fiber side (81) and the longitudinal length of the optical fiber (9) between the optical fiber first end (69) and the optical fiber second end (71). A suitable side-emission optical fiber (83) can be produced by forming the clad (79) from tetrafluoroethylene/perfluoroalkyl vinyl ether copolymer (PFA) or a tetrafluoroethylene/hexafluoropropylene copolymer (FEP) due to the excellent transparency and ready extrusion of the material into a tubular clad (79). Further, due to the excellent heat resistance and elongation properties of these materials, these materials are suitable for injecting a thermosetting resin within the tubular clad (79) to establish the core (78) therein. The thermosetting resin for the core (78) can comprise a thermosetting silicone resin; however, these examples of materials for the core (78) and the clad (79) are not intended to preclude the use of any type of materials for the core (78) and clad (79) which achieve the desired internal reflection and side-emittance of the integrated light (24'). The diameter of the optical fiber (9) can be in the range of about 0.005 inches (about 0.13 mm) to about 0.040 inches (about 1.0 mm); although optical fibers (9) having a greater or lesser diameter can be used. The tubular clad (79) can during the extrusion process be extruded along a path, or the optic fiber (9) can be heated and formed, to resemble the three-dimensional shape of human or animal hair, for example, straight, waves, curls or coils.

Now, referring primarily to FIGS. 1, 9 and 11, embodiments of the fiber optic hair sample (8) can further include radio frequency identification tag ("RFID") (84) which can be encoded with digital data. The RFID tag (84) can include an antenna (85) coupled to a read only memory (86) (also referred to as a "EEPROM") which can be erased and reprogrammed using a pulsed voltage. As an illustrative example the RFID tag can be near-field communication tag ("NFC tag") which communicates using the ISO 14443A standard, and compatible with NFC Forum standards and ISO 9001:2015 Quality Management and ISO 14001:2015 Environmental Management. Once the RFID tag (84) is in range of the magnetic field of computing device (12) (such as a smartphone) or the hair color selector (7) (or the integrated unit (2, 7)), electrons in the antenna (85) produce a current. The current generated can be enough to power the circuitry in RFID tag (84). The RFID tag (84) can function to pair with the computing device (12) and transfer RFID data (87) from the read only memory (86) to the computing device (12), typically over the 13.56 MHz NFC transmission frequency at either 106, 212 or 424 Kbps. The RFID data (87) can include the fiber optic hair sample identification number (88) which can be correlated by the program (18) with fiber optic hair sample data (89), such as, optical fiber structure (type of core (78), type of clad (79), optical fiber diameter, optical fiber length, optical fiber form) which can be correlated with a selected color (5) in the color space (6) to adjust color attributes (28) of the integrated light (24') to correspondingly achieve the color (5) in the illuminated optical fibers (9), number of uses, users, date of manufacture, or the like.

In operation, a user (19) inserts the fiber optic hair sample (8) into the hair color selector (7) or the integrated unit (2, 7). In the illustrative example, the bundle holder (72) can be inserted into the hair color selector (7), or integrated unit (2, 7) to receive the integrated light (24') on the bundle proximal end (68). The user (19) can then select a color (5) from the color space (6) and the program (18) can operate to convert the selected color (5) to color data (45) and cause the color data (45) to be transmitted to the controller (44) which correspondingly operates the control circuit (64) to deliver power to the light emitter driver circuits (66). The power applied to each of the different light emitters (23) can be adjusted the wavelength amplitude (27) for each different wavelength frequency (26) to establish the color attributes (28) (spectral characteristics) of the integrated light (24') passing through the optical aperture (36) and the optical tube (55). The color attributes (28) of the integrated light (24') established by the controller (44) incident upon the bundle proximate end (68) and propagated toward the bundle second end (70) emits visible light from the optical fiber bundle (67) corresponding to the user (19) selected color (5). The fiber optic hair sample (8) emitting visible light of the user (19) selected color (5) allows the user (19) to visualize the look and feel of a hair sample (4) of the selected color (5).

Now, with primary reference to FIGS. 1 and 21 through 32, the hair color analyzer (2), the hair color selector (8), the hair colorant mixer (10) can be responsive to user indications (20) from one or more client computing devices (12) directly or via the network (14) through the server computer (13). A client computing device (12) can include a client computing device processor (90) communicatively coupled to a client computing device non-transitory computer readable media (91) containing computer executable instructions including in whole or in part the program (18) to implement the functionalities of the client computing device (12) in the system (1). The client computing device (12) can, as illustrative examples, be: a desktop computer device or a mobile computer device, such as, personal computers, slate computers, tablet or pad computers, cellular telephones, personal digital assistants, smartphones, programmable consumer electronics, or combinations thereof. The program (18) accessed by or downloaded to the client computing device (12) can allow a user (19) access to the functionalities of the system (1) whether on-line or off-line depending on the application.

Again, with primary reference to FIGS. 1 and 21 through 32, in particular embodiments, the hair colorant selection and hair colorant formulation program (18) can be accessed by or downloaded from one or more server computers (13) to the client computing device (12)(as shown in the flow diagram of FIG. 1) to confer all or a part of the functions of the program (18) and the system (1) to the client computing device (12).

In particular embodiments, the program (18) can be executed to communicate with the server computer (13) over the network (14) to coordinate operation of the client computing device (12) with operation of one or more of: the hair color analyzer (2) or the hair color selector (7) (or the integrated unit (2, 7)), or the hair colorant mixer (10). However, this is not intended to preclude embodiments in which the program (18) may be contained on or loaded to the client computing device (13), the hair color analyzer (2) or the hair color selector (7) (or the integrated unit (2, 7)), or the hair colorant mixer (10) from one or more of: a computer disk, universal serial bus flash drive, or other computer readable media. While embodiments of the program (18) may be described in the general context of computer-executable instructions such as program modules which utilize routines, programs, objects, components, data structures, or the like, to perform particular functions or tasks or implement particular abstract data types, it is not intended that any embodiments be limited to a particular set of computer-executable instructions or protocols. Additionally, in particular embodiments, while particular functionalities of the program (18) may be attributable to the server computer (13), the computing device (12), the hair color analyzer (2), the hair color selector (7) (or the integrated unit (2, 7)), or the hair colorant mixer (10); it is to be understood that embodiments may allow implementation of a function by more than one device, or the function may be coordinated between more than one device.

Now, with primary reference to FIG. 1, each of the one or more computing devices (12) can, but need not necessarily, include an Internet browser (92) (also referred to as a "browser"), as illustrative examples: Microsoft's INTERNET EXPLORER®, GOOGLE CHROME®, MOZILLA®, FIREFOX®, which functions to download and render computing device content formatted in "hypertext markup language" (HTML). In this environment, the one or more computer servers (13) can contain the program (18) including instructions to implement the most significant portions of one or more graphical user interface(s)(21) including a combination of text and symbols to represent options selectable by user indications (20) to execute the functions of the program (18). As to these embodiments, the one or more computing devices (12) can use the browser (86) to depict the graphical user interface (21) and computing device content and to relay selected user indications (20) back to the one or more computer servers (13). The one or more computer servers (13) can respond by formatting additional content for the respective portions of the graphical user interface (21) (as shown in the illustrative examples of FIGS. 18 through 29 further described below).

Again, referring primarily to FIG. 1, in particular embodiments, the one or more computer servers (13) can be used primarily as sources of computing device content, with primary responsibility for implementing the graphical user interface (21) being placed upon each of the one or more computing devices (12). As to these embodiments, each of the one or more computing devices (12) can download and run the appropriate portions of the program (18) implementing the corresponding functions attributable to the client computing device (13).

Now, primary reference to FIGS. 21 through 32, the program (18) can in part include computer instructions to implement and depict a graphical user (21) on the display surface (93) of the computing device (12) which correspondingly allows a user (19) by user indications (20) in the graphical user interface (21) to execute one or more functions of the program (18). The user indications (20) in the graphical user interface (21) execute one or more functions of the program (18), which user indications (20) as illustrative examples, can include: selection of one or more control icon(s), entry of text into one or more fillable fields, voice command, keyboard stroke, mouse button point and click, touch on a touch screen, or otherwise, or combinations thereof (individually and collectively referred to as a "user indications").

Figure 21:
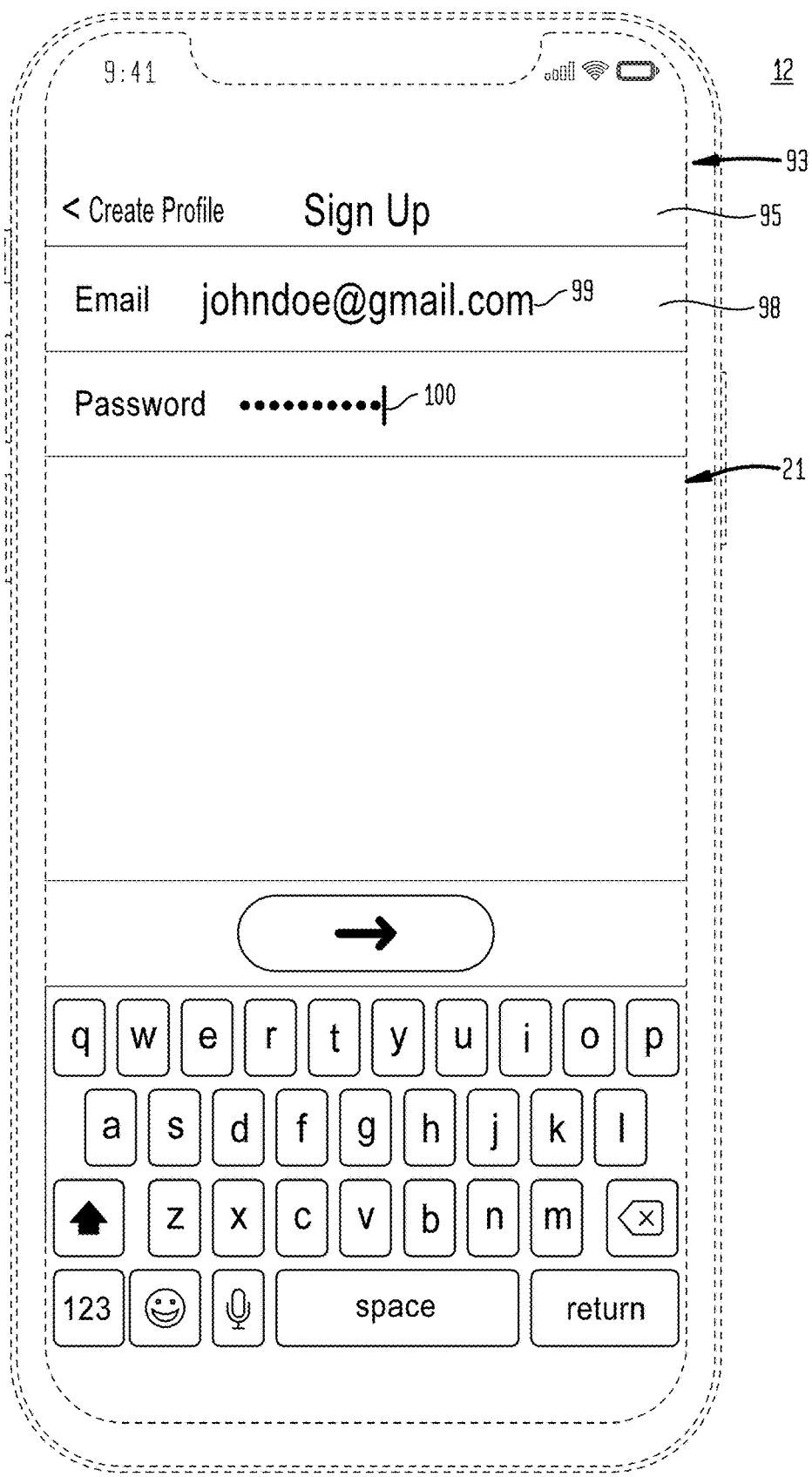
FIG. 21 illustrates login menu of a particular embodiment of a graphical user interface depicted on a display surface of a computing device.

Now referring primarily to FIGS. 1 and 21, embodiments of the program (18) can, but need not necessarily, include a signup module (94) which upon execution depicts a sign up menu (95) which by user indications (20) allows the user (19) to create a user account (96) under which the user (19) can be authenticated by the system (1) and correspondingly receive authorization to access resources provided by or connected to the system (1) and access or load the program (18). The term "menu" for the purposes of this invention means a list of options or commands presented to the user (19) of the computing device (12). A menu may either be the entire graphical user interface (21), or only part of a more complex graphical user interface (21) and may include one menu image or a plurality of images in which user indications (20) can be made to activate the various functions of the program (18). The term "module" for the purposes of this invention means a component or part of the program (18) that contains one or more routines. One or more modules make up the program (18).

Again, referring primarily to FIGS. 1 and 21, embodiments of the program (18) can, but need not necessarily, include a login module (97) which upon execution depicts a login menu (98) which by user indications (20) allows the user (19) to log in to a user account (96). To login to a user account (96), a user (19) is typically required to authenticate oneself with a user name (99) and a password (100) or other credentials, such as fingerprint or facial recognition, for the purposes of accounting, security, and resource management.

Now, with primary reference to FIGS. 1 and 22 through 32, embodiments of the program (18) can, but need not necessarily, include a setup module (102) which by user indications (20) allows default settings or values to be assigned to the program (18) or the computing device (12). Certain embodiments can, but need not necessarily, be provided with defaults or presets which provide settings or values automatically assigned by or to the program (18) outside of user (19) intervention. For the sake of brevity, the particular illustrative example depicted in FIGS. 19 through 26, and further described below, include only one computing device (12); however, this not intended to preclude embodiments in which the operation of one computing device (12) coordinates the operation of a plurality of computing devices

(12) in a computer client-computer administrator relationship within the system (1), or embodiments in which a first computing device (12') and a second computing device (12")) have respective operation coordinated by the system (1) in which first and second computing devices (12', 12") have a relationship in which the program (18) functions are discretely allocated between the first and second computing device (12', 12"), and in particular wherein a client computing device (12') and a service provider computing device (12") are coordinated to provide a client-service provider relationship, such as between a customer computing device (12') and a hair stylist computing device (12").

Again, with primary reference to FIGS. 1 and 22 through 32, in particular embodiments in which a user (19) desires to have hair styled or the hair colored, a setup module (102) can function to display a setup menu (103) on the display surface (93) of the computing device (12) which, as an illustrative example, allows creation of a user profile (104) by entry by user indications (20) to select one or more hair categories (105) including as illustrative examples: a hair length (106), a hair type (107), a hair thickness (108), a hair density (109), a hair porosity (110), a hair sheen (111), hair health (112), or other hair categories (105) relevant to having the user's (19) hair styled or having user's (19) hair colored. A user profile (104) can be stored in the computer server (13) or the computing device (12) including the default or user selected values for each hair category (105) which can be subsequently exploited by the program (18) to control functions of components within the system (1) by correlation with the default or user selected hair category values (113) under a set of rules to achieve the user's (19) selected hair color (5) selected within the color space (6) depicted in the graphical user interface (21).

Now, with primarily reference to FIGS. 22 through 29, in an illustrative example, user selection of each of the hair categories (105) can activate the program (18) to correspondingly further depict setup menu pages which allow by user indications (21) entry or selection of category values (113) for each of the selected hair categories (105) including as examples: hair length (106) (short, medium, long or current length from the proximal end of the hair at the scalp to the distal terminal end of the hair) (example shown in FIG. 20); hair type (107) (straight, wavy, curly, coily) (example shown in FIG. 21); hair thickness (108) (diameter of an individual hair typically in a range of 0.04 mm to 0.12 mm, or by selection of "Fine", "Medium" or "Course" hair) (example shown in FIG. 22); hair density (109) (hairs growing on the head in one square inch, or by selection of "Low", "Medium", or "High" hair density)(example shown in FIG. 23); hair porosity (110) ("Low", "Medium", or "High", in particular embodiments by float test) (example shown in FIG. 24); hair sheen (111) (by selection of "Gloss", "Semigloss", or "Matte") (example shown in FIG. 25); hair health (112) (which can be selected or by slider in an incremented scale between "Unhealthy" and "Healthy") (example shown in FIG. 26); however, these illustrative examples are not intended to preclude depiction of additional or alternate hair categories or hair values which may relate to the hair of a user, or anatomical or physiological attributes of a user (19), such as, head shape, skin color or tone, eye color, facial hair, age, height or weight.

Figure 2:
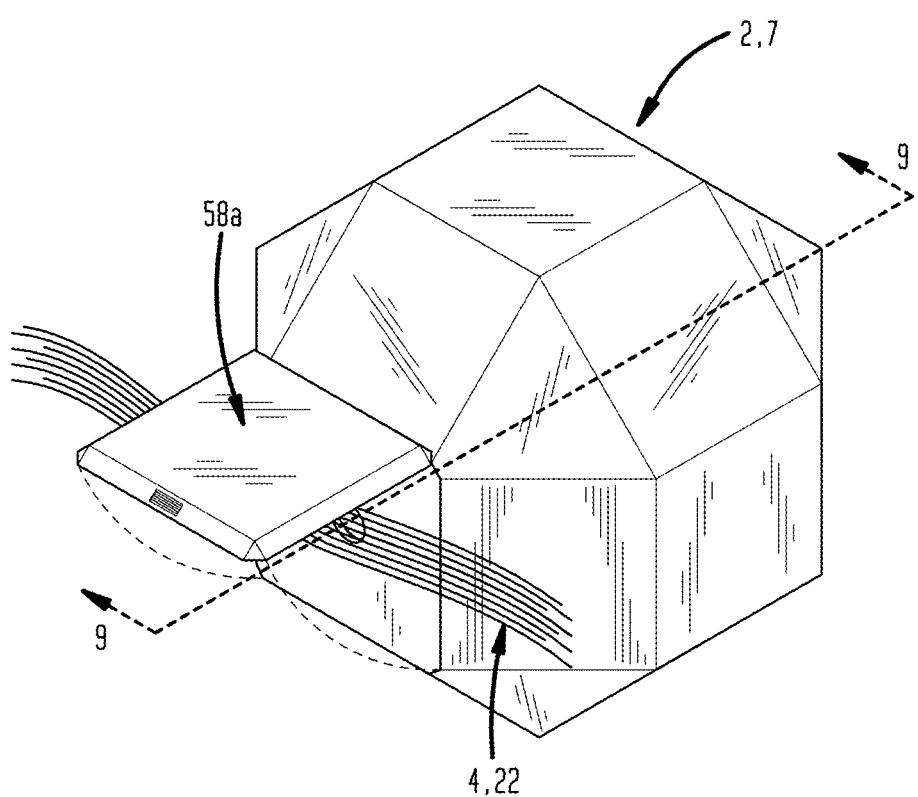
FIG. 2 is perspective view of a particular embodiment of a hair color analyzer having a closure which operates between an open condition and a closed condition over a hair sample.
Figure 3:
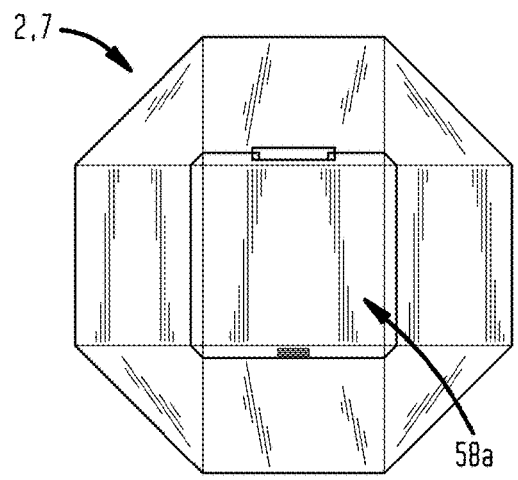
FIG. 3 is a top plan view of the particular embodiment of the hair color analyzer.
Figure 4:
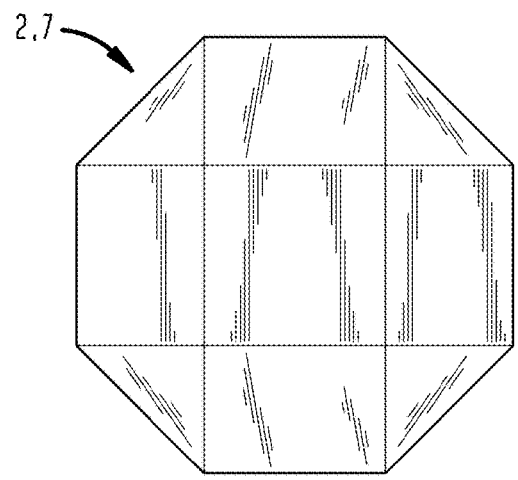
FIG. 4 is a bottom plan view of the particular embodiment of the hair color analyzer.
Figure 5:
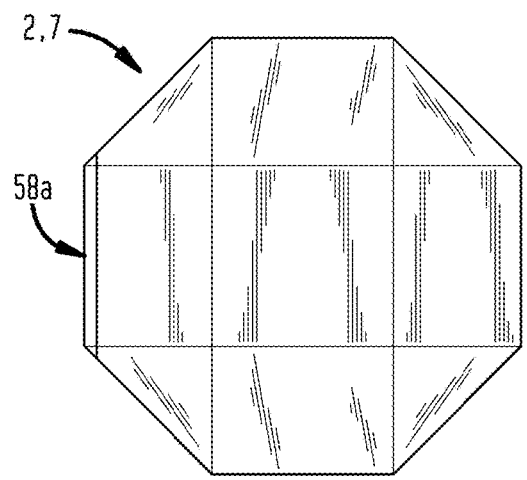
FIG. 5 is a first end elevation view of the particular embodiment of the hair color analyzer.
Figure 6:
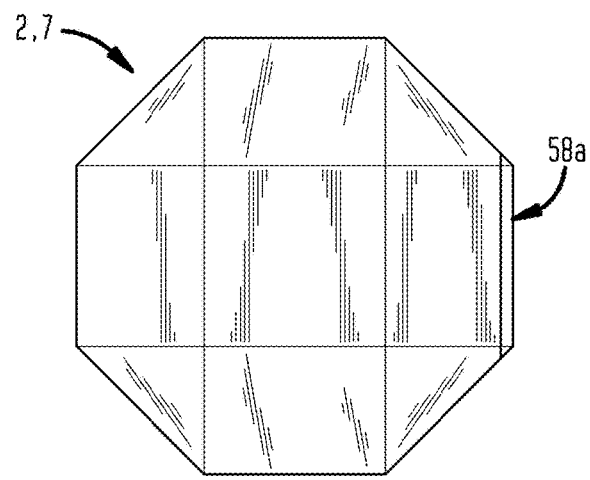
FIG. 6 is second end elevation view of the particular embodiment of the hair color analyzer.
Figure 7:
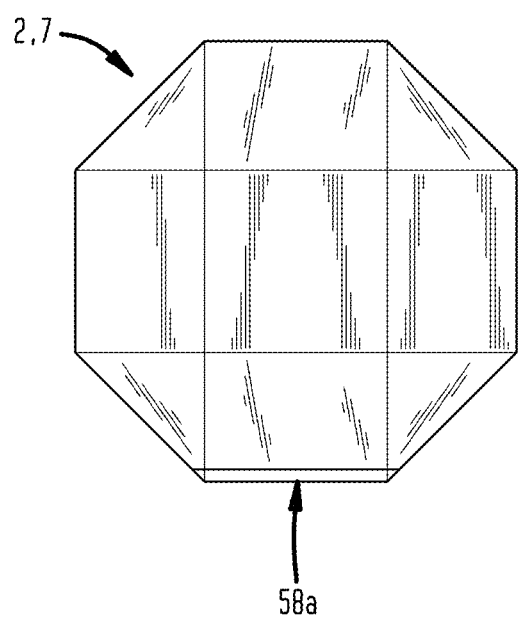
FIG. 7 is first side elevation view of the particular embodiment of the hair color analyzer.
Figure 8:
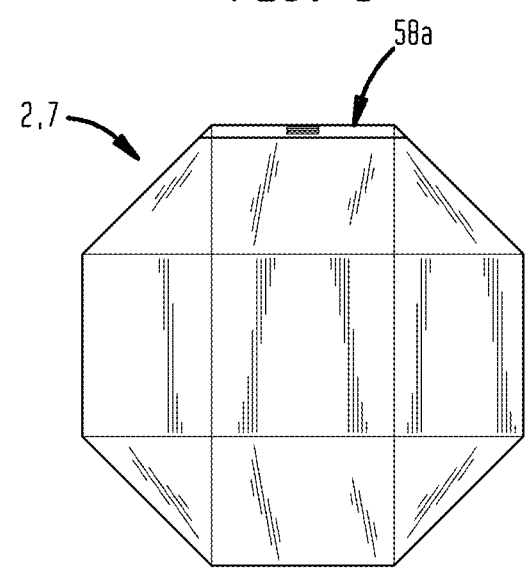
FIG. 8 is a second side elevation view of the particular embodiment of the hair color analyzer.
Figure 19:
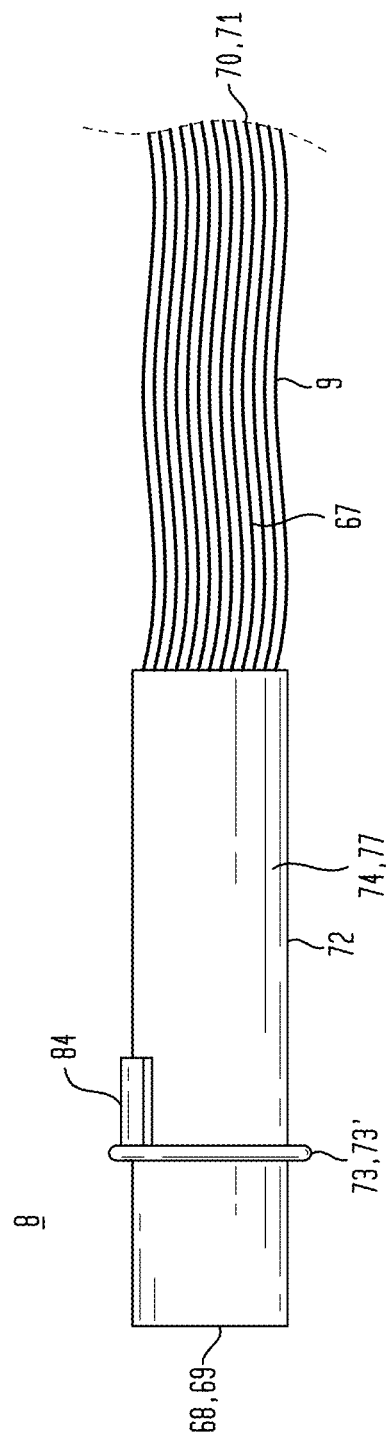
FIG. 19 is a fourth side elevation view of the particular embodiment of the fiber optic hair sample.
Figure 20:
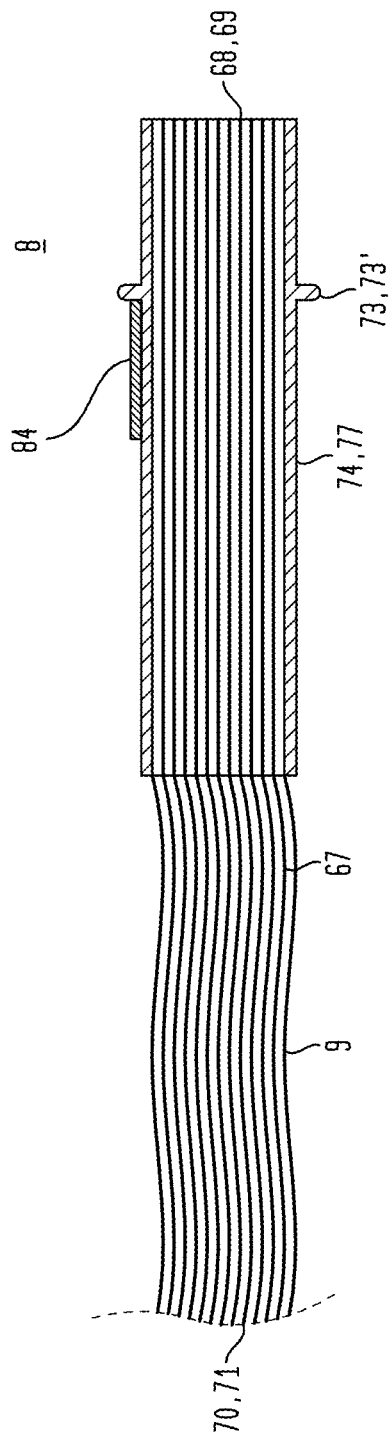
FIG. 20 is a cross section view 20-20 of the particular embodiment of the fiber optic hair sample shown in FIG. 14.
Figure 22:
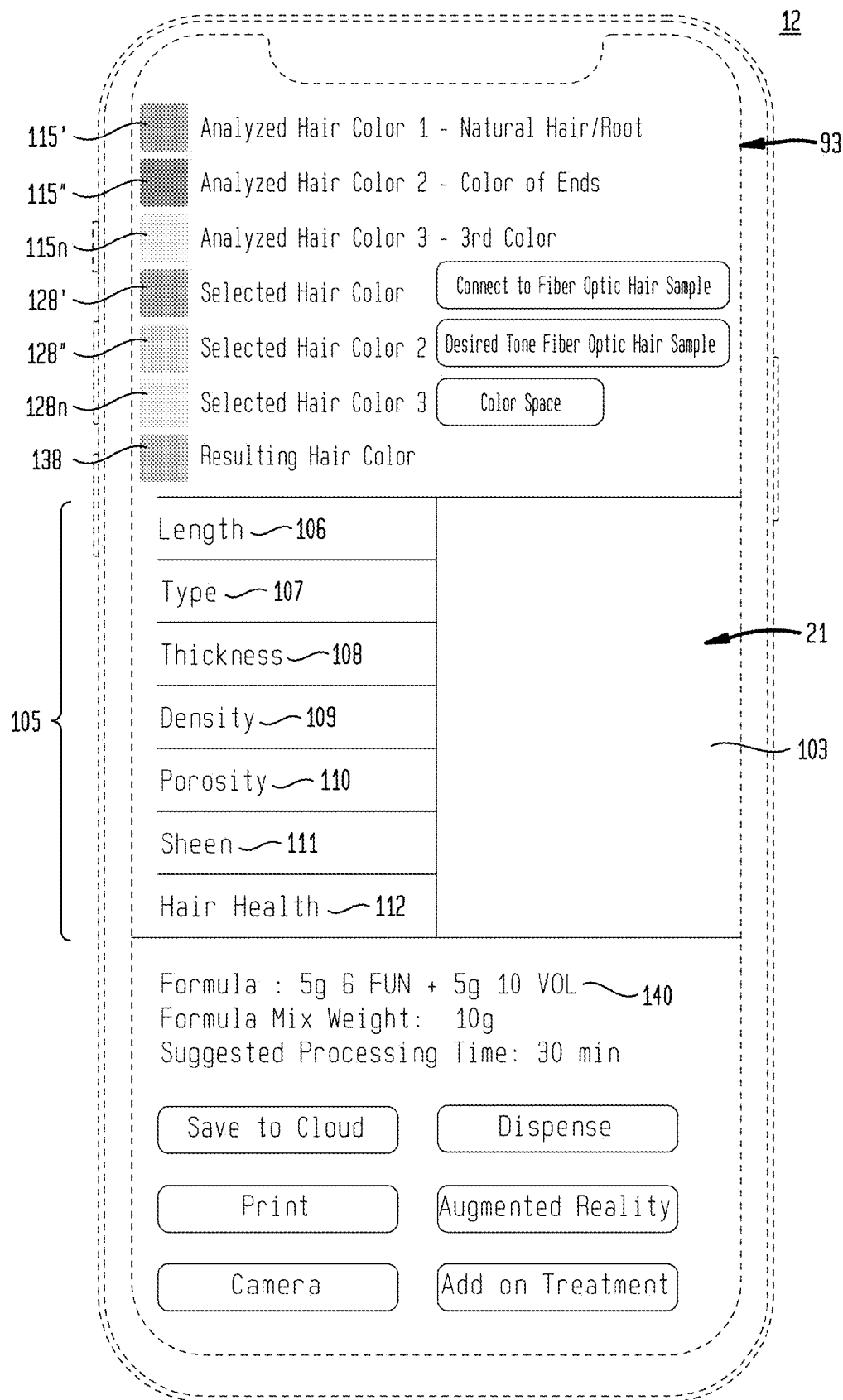
FIG. 22 illustrates a setup menu of a particular embodiment of a graphical user interface depicted on a display surface of a computing device including hair categories selectable to allow entry by user indication of hair category values.
Figure 23:
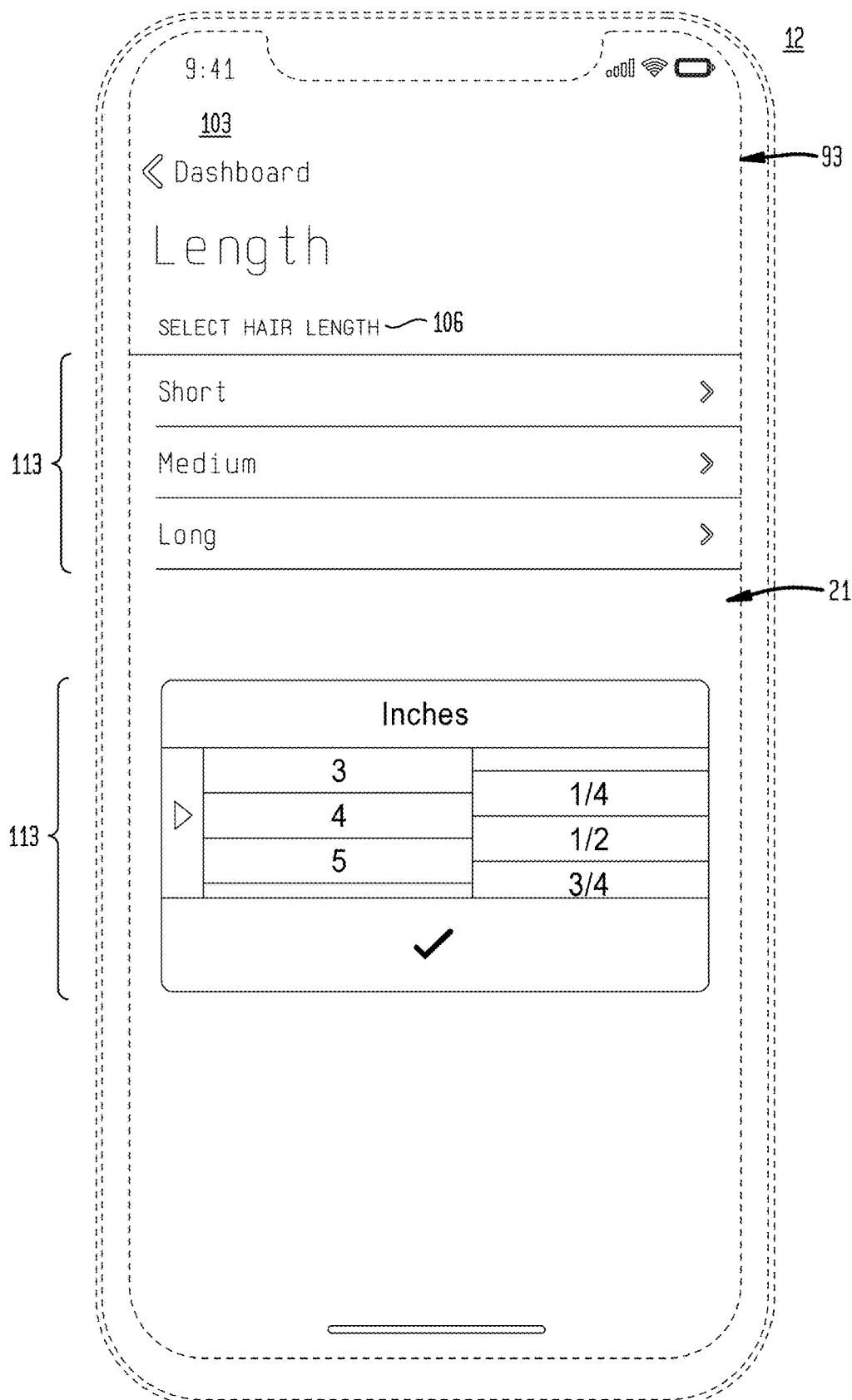
FIG. 23 illustrates a setup menu page including a hair length category which by user indications allows entry of hair length values.
Figure 24:
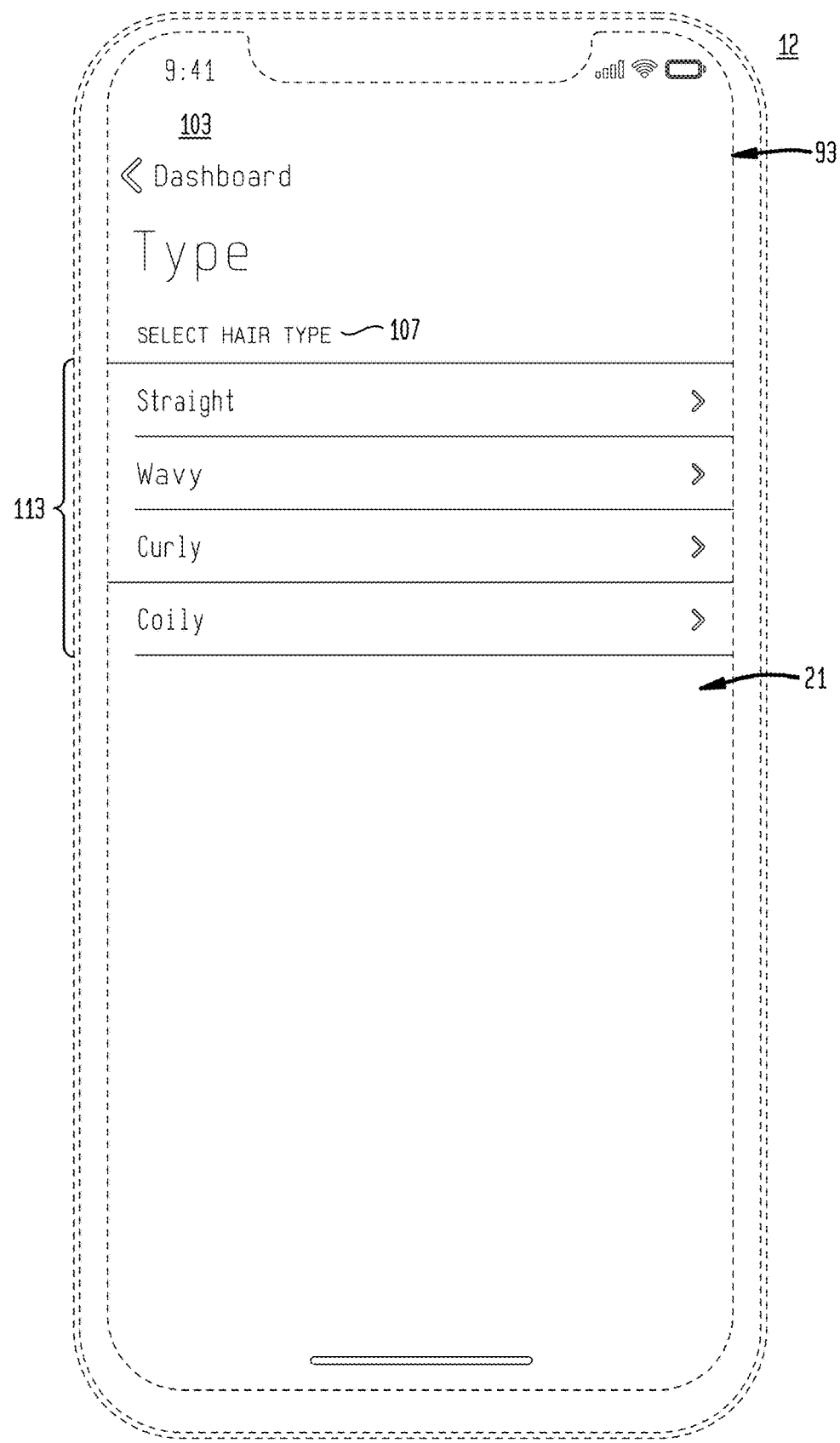
FIG. 24 illustrates a setup menu page including a hair type category which by user indications allows entry of hair type values.
Figure 25:
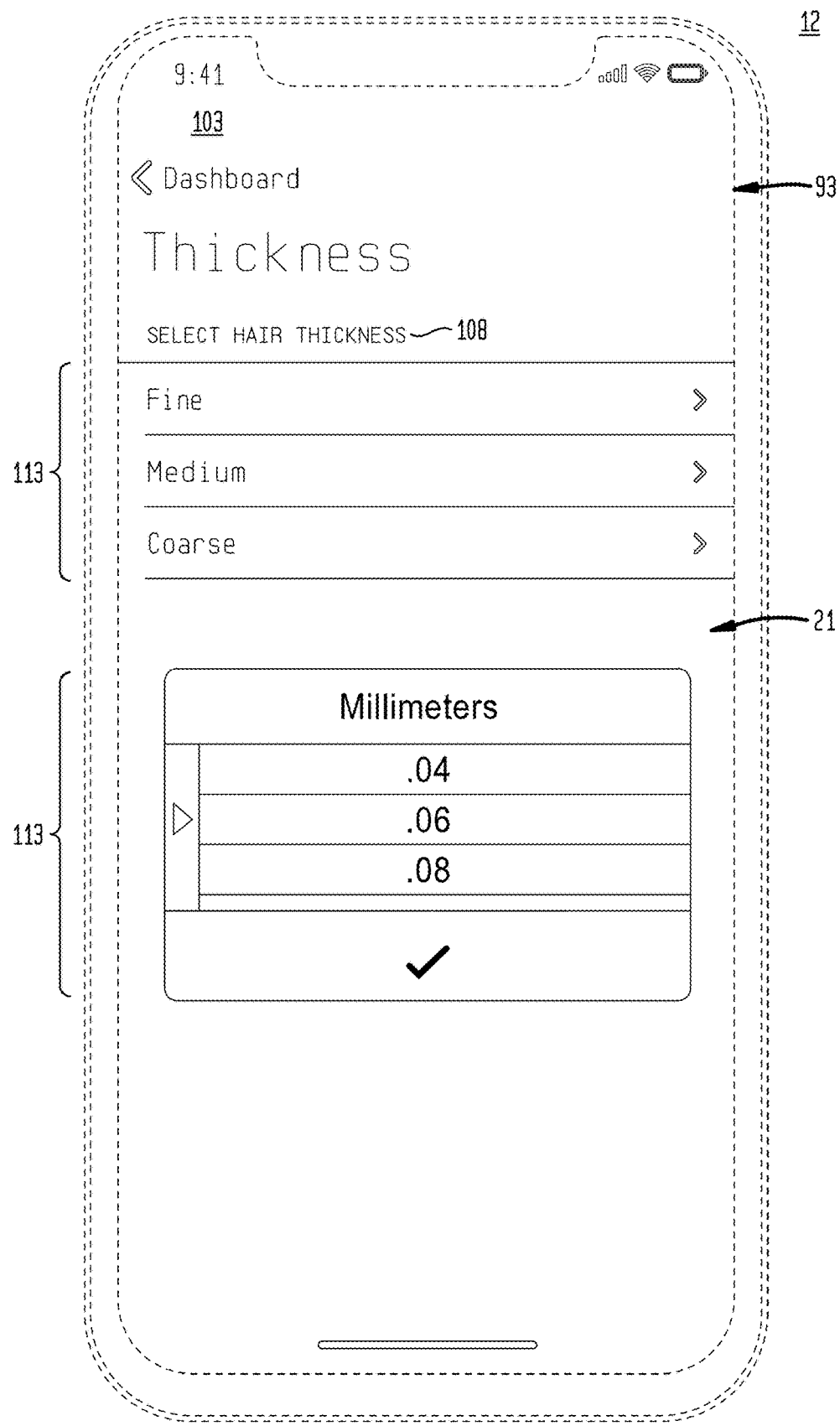
FIG. 25 illustrates a setup menu page including a hair thickness category which by user indications allows entry of hair thickness values.
Figure 26:
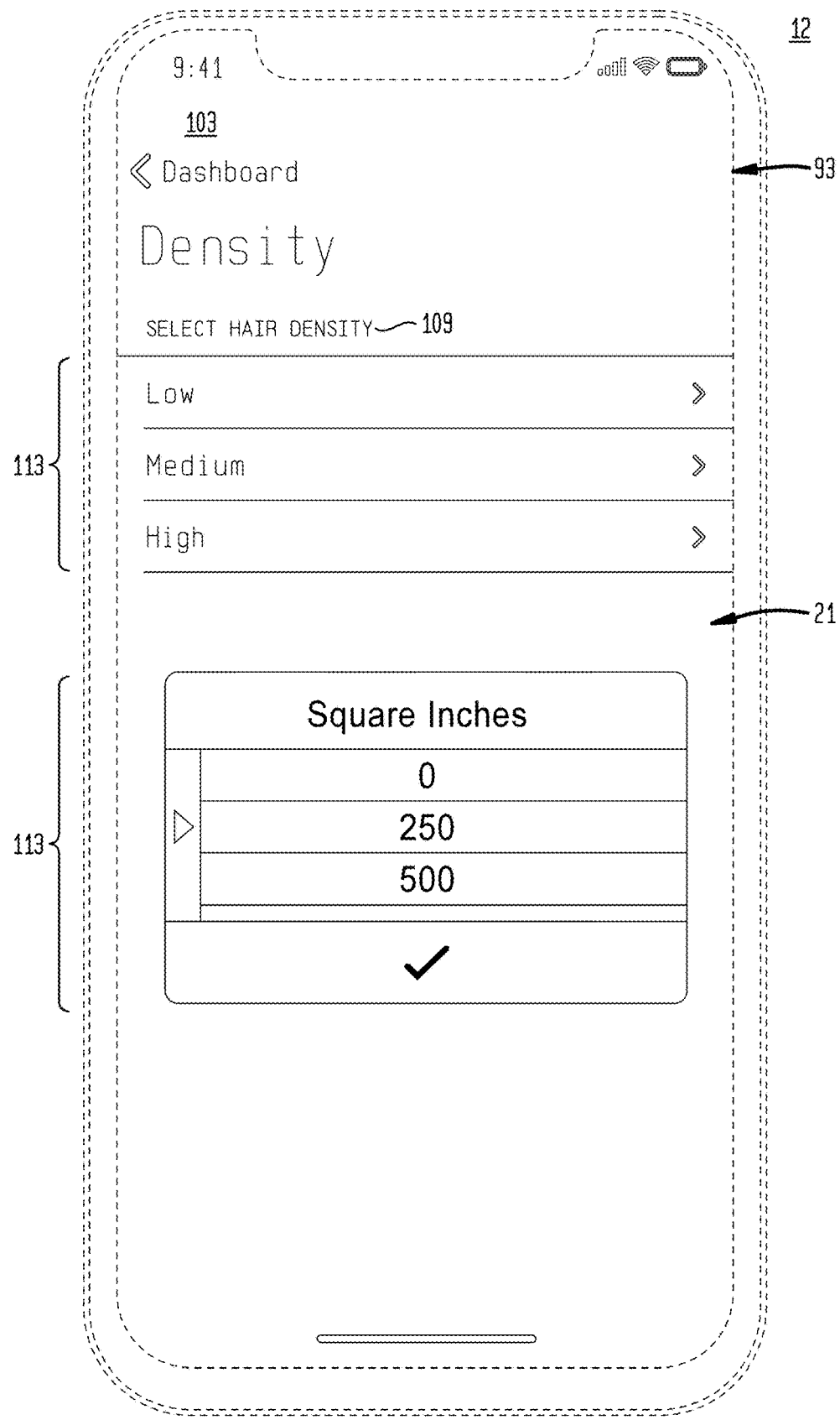
FIG. 26 illustrates a setup menu page including a hair density category which by user indications allows entry of hair density values.

Again, with primary reference to FIGS. 1, 2 and 22, in particular embodiments, the program (18) can further include a hair color analyzer module (114) which functions to pair the computing device (12) with the hair color analyzer (2), whether automatically based on proximity to the hair color analyzer (2) or by user indications (20) in the graphical user interface (21), and as a above described the hair color analyzer (2) can be used to analyze a hair sample (4) to generate color data (45) which the program (18) can covert and match to a color (5) in a color space (6). The program (18) can the further function to depict an analyzed hair color icon (115) (as shown in the example of FIG. 19 as a square icon identified as "Analyzed Hair Color") in the setup menu (103) of the color (5) matched in the color space (6) based on the color data (45) obtained by analyzing the hair sample (4). In particular embodiments, a plurality of hair color icons (115', 115" . . . $115_n$) representing the analyzed hair color (116) can be correspondingly referenced to a first hair color analysis (116') of a first hair sample (4') (for example the hair proximate the hair root), a second hair color analysis (116") of a second hair sample (4") (for example the hair distal from the hair root) . . . $_n$ hair color analysis ($116_n$) of a $_n$ hair color samples ($4_n$).

Figure 27:
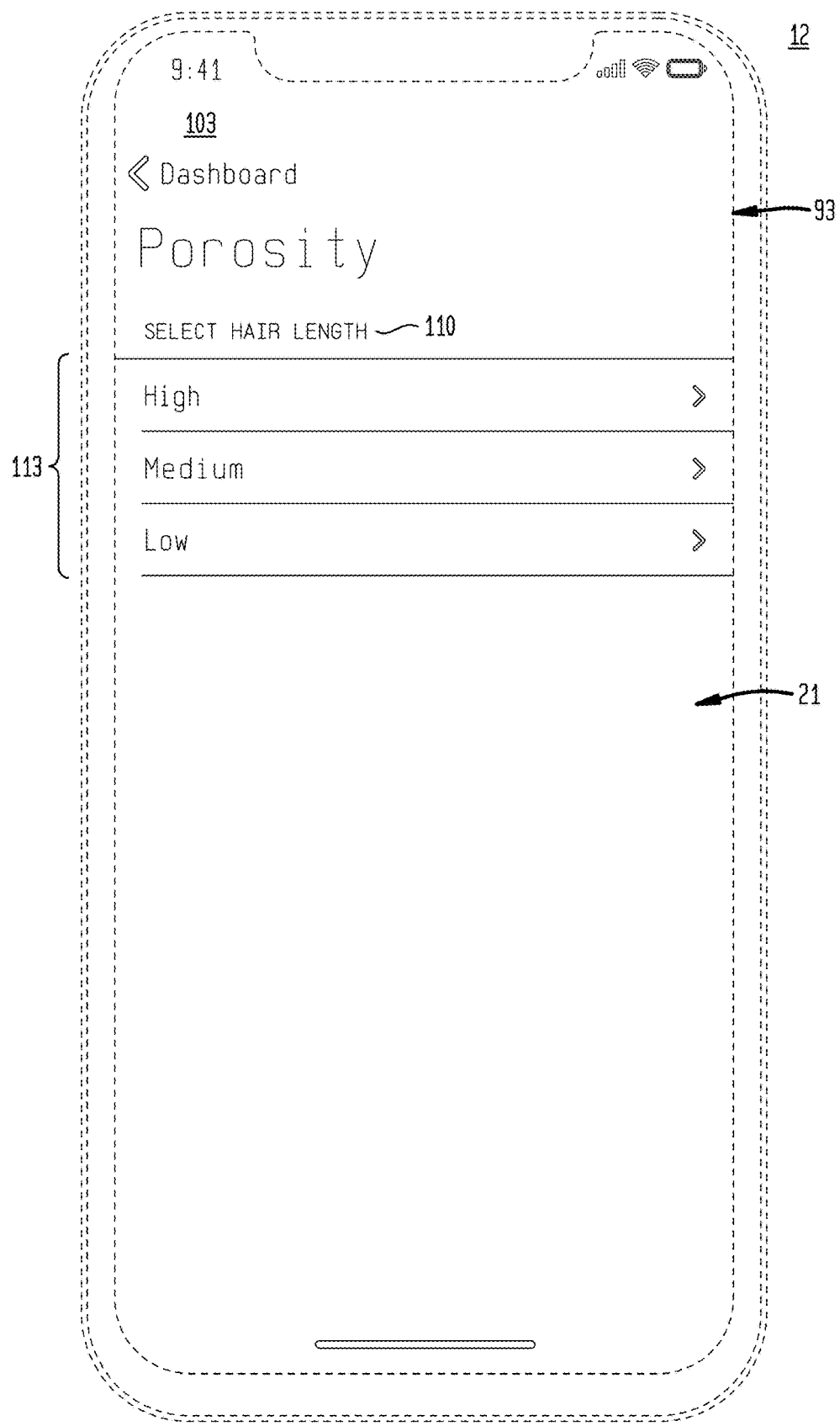
FIG. 27 illustrates a setup menu page including a hair porosity category which by user indications allows entry of hair porosity values.
Figure 28:
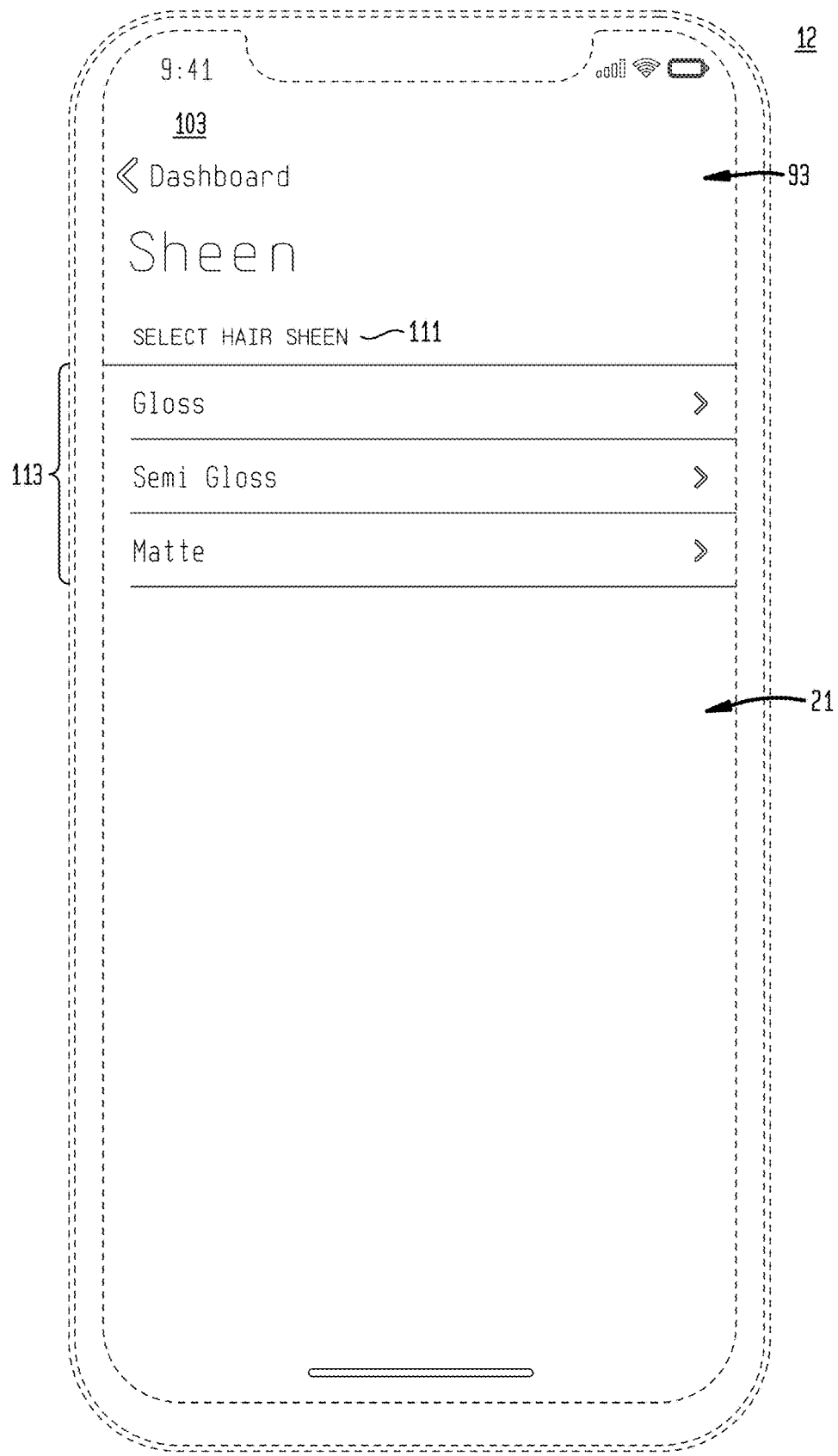
FIG. 28 illustrates a setup menu page including a hair sheen category which by user indications allows entry of hair sheen values.

Now, with primary reference to FIGS. 1 and 30 through 32, in particular embodiments, the program (18) can further include a color space module (117) which functions to depict in the setup menu (103) of the graphical user interface (21) a color space representation (118) of a color space (6) having a specific organization of colors (5) supported by the system (1). By user indications (20) in the color space representation (118), a user (19) can select a color (5) in the color space (6). While the illustrative example of the color space representation (118) shown in FIG. 27 comprises a color selection panel (119) depicting colors in an RGB color space in a 12×12 columns and line gradient color format; this is not intended to preclude embodiments which depict other color spaces (6)(which can be interconverted) or depicted in other color space representations such as color space representation of a swatch book (118')(as shown in the example of FIG. 28) a color wheel, color chips, color swatches, all of which can be converted to color data (45) by the program (18).

Figure 29:
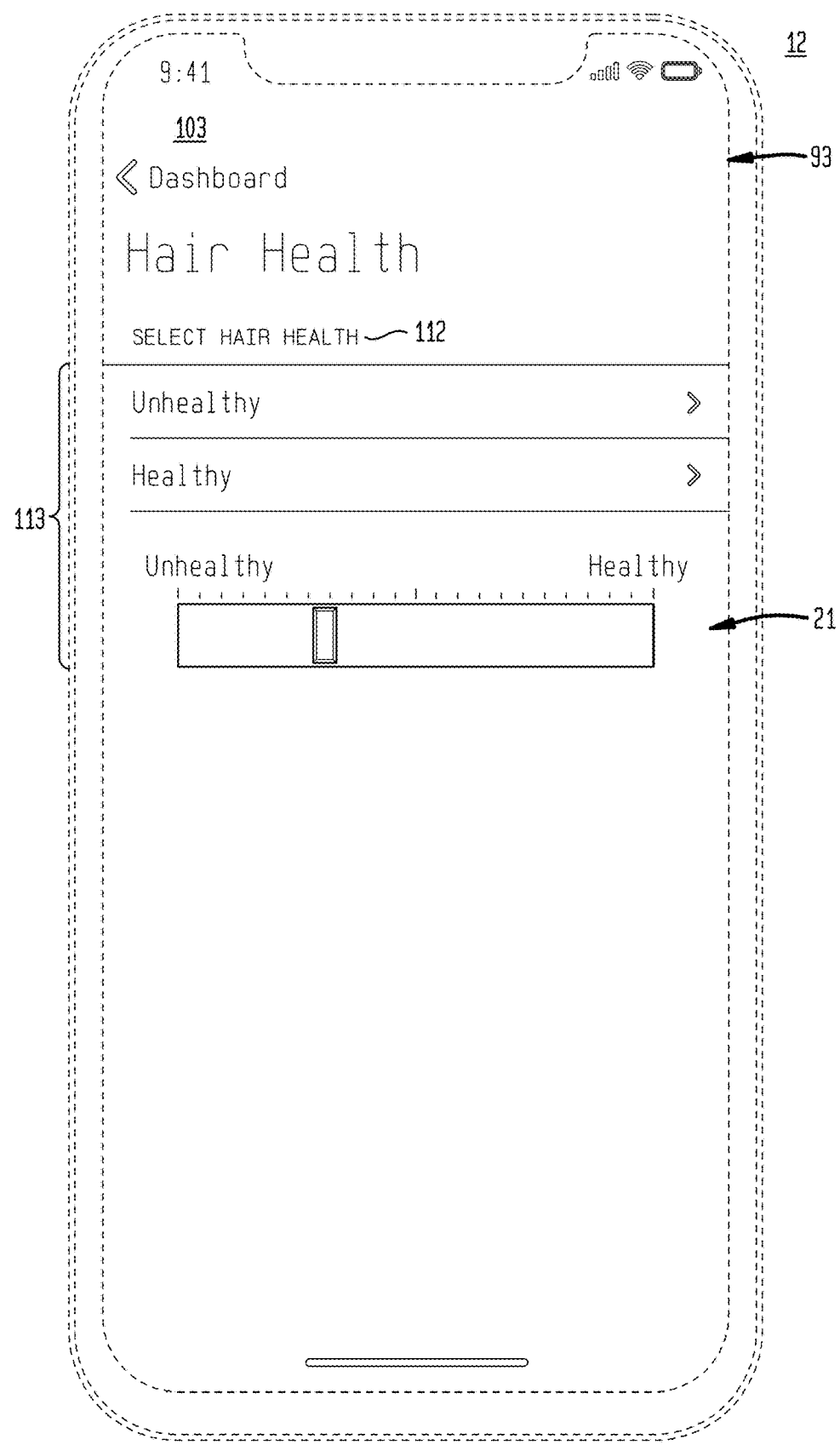
FIG. 29 illustrates a setup menu page including a hair health category which by user indications allows entry of hair health values.
Figure 30:
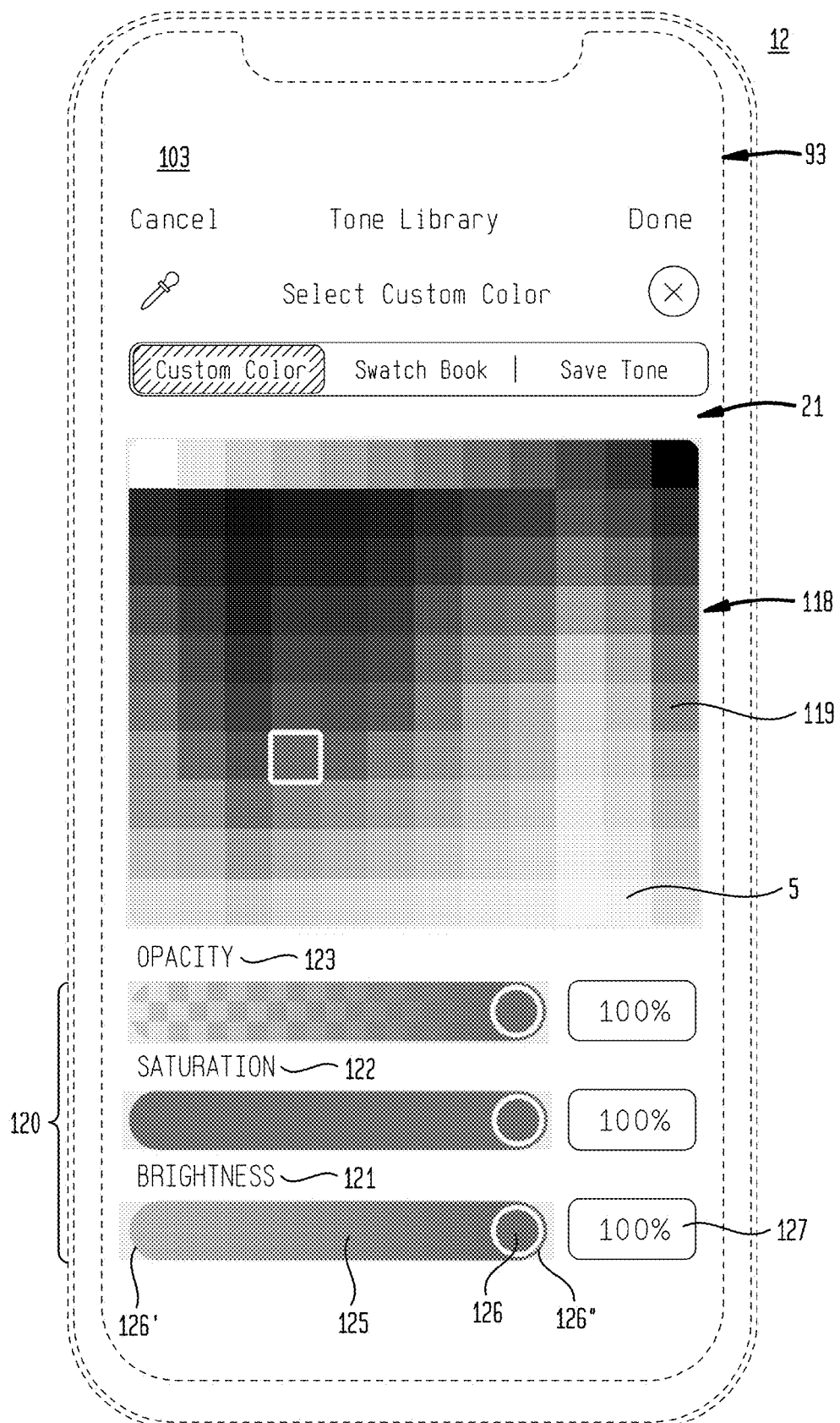
FIG. 30 illustrates a setup menu page including an embodiment of a color space representation of a color space including color selection panel.
Figure 31:
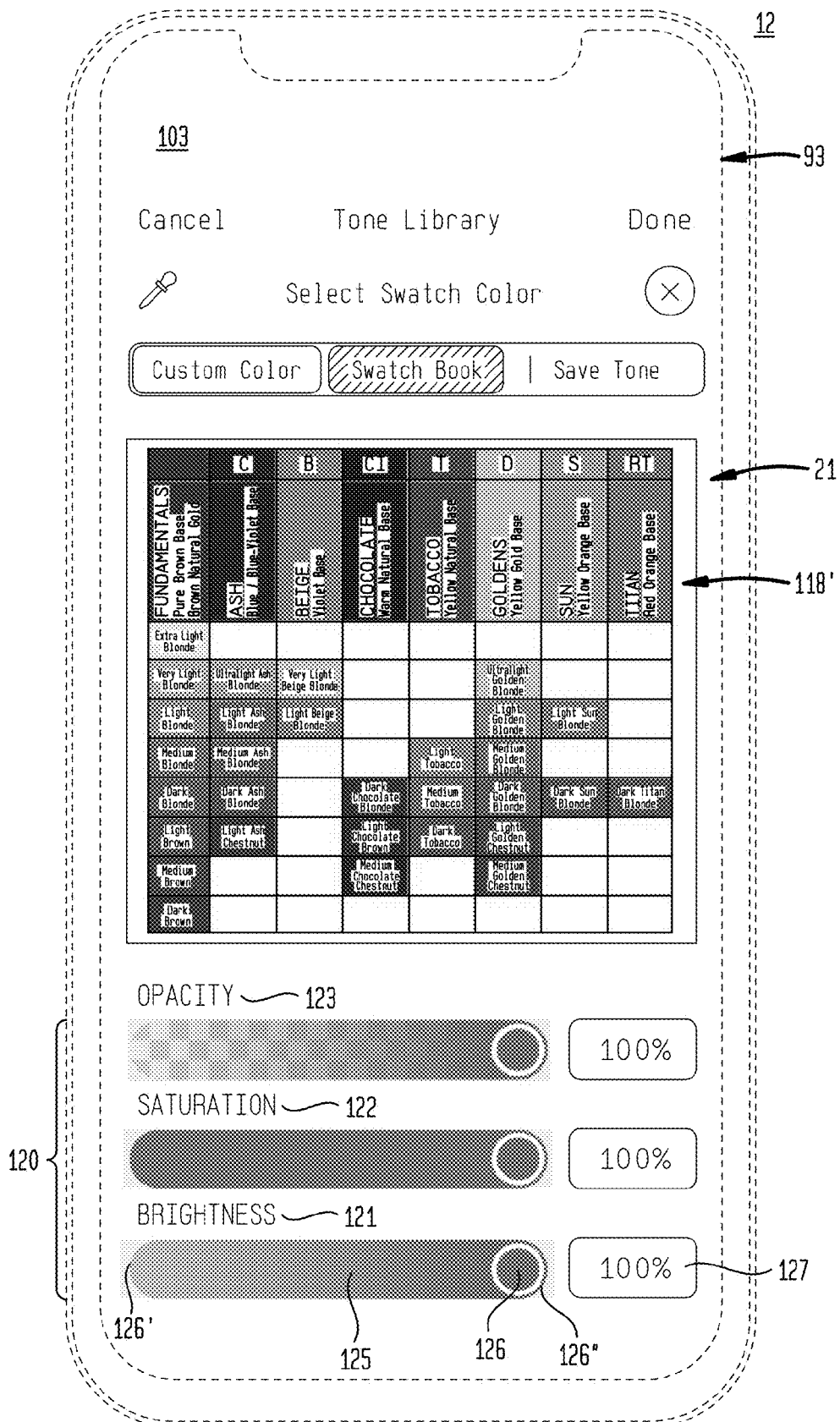
FIG. 31 illustrates a setup menu page including another embodiment of a color space representation of a color space including swatch color book.
Figure 32:
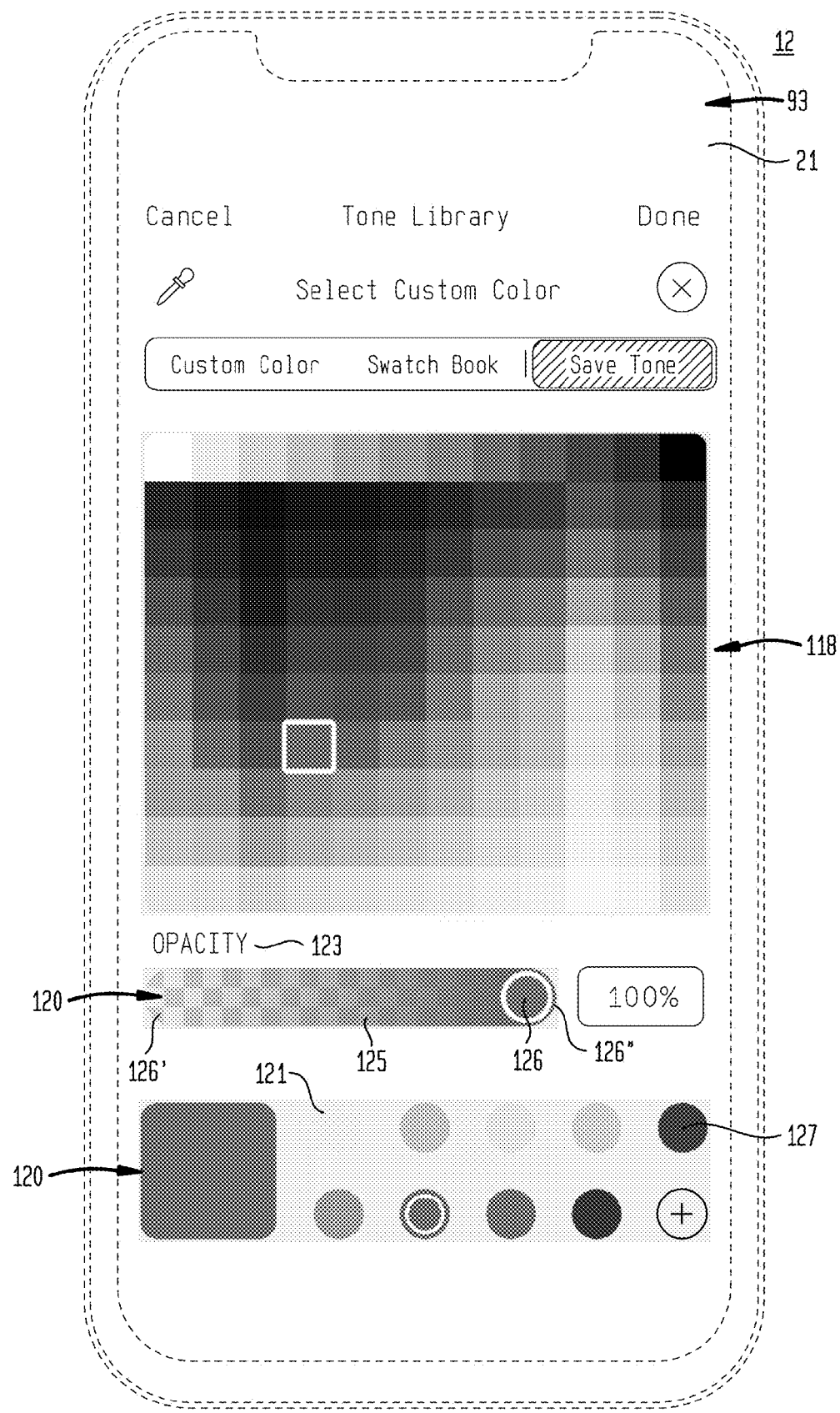
FIG. 32 illustrates an embodiment of a color space representation of a color space including color selection panel which by user indications saves a selected color in the color space representation.

In particular embodiments, the program (118) can further depict one or more incrementally scaled color attribute selectors (120) which by user indications (20) allow incremental selection of a color attribute (28) of a color (5), such as color brightness (121) (relative lightness or darkness of a color hue), color saturation (122) (relative intensity of color hue from grey tone), color opacity (123), color tone (124) (relative amount of grey added to a color hue), color tint (relative amount of white added to a color hue), color shade (relative amount of black added to color hue). The illustrative example depicted in FIGS. 27 through 29 allows the user (19) to adjust a color attributes (28) by use of a slider or track bar (125) having an indicator (126) movable in the track bar (125) between track endpoints (126', 126") to correspondingly adjust a color attribute value (127); however, this illustrative example is not meant to preclude other graphical user interface elements to adjust color attributes (28) such a first click event to select a color attribute and a second click event on a bullet in a scale (as shown in the examples of FIGS. 27 through 29.

The program (18) can the further function to depict a selected hair color icon (128) (depicted in FIG. 22 as a square icon (identified as "Selected Hair Color") representing the selected hair color (129) in the setup menu (103) having the color (5) matched in the color space (6) based on the color data (45) obtained by user indications (21) of a color (5) in the color space representation (118) depicted in the graphical user interface (21). In particular embodiments, a plurality of selected hair color icons (128', 128" . . . $0.128_n$) can be correspondingly referenced to a first selected color (129'), a second selected color (129") . . . $_n$ selected hair color ($129_n$) to allow comparison by the user (19).

Now, with primary reference to FIGS. 1 and 22, the program (18) can further include a hair color selector module (130) which functions to covert the selected color (129) to color data (45) and calibration data (131) and by operation of the electronic data exchanger (46) can transmit the color data (45) and calibration data (131) to the hair color selector (7) or integrated unit (2, 7). The controller (44) can calibrate the light emitters (23) based on the calibration data (130) and can process the color data (45) and correspondingly control the power to each of the light emitter drive circuits (66) to achieve the wavelength amplitude (27) for each different wavelength frequency (26) to generate the integrated light (24') having the selected color (129) selected by the user (19) in the color space representation (118) depicted in the graphical user interface (21). The user (19) can then insert the bundle holder (72) of the fiber optic hair sample (8) into the hair color selector (7) or integrated unit (2, 7). Color attributes (28) (spectral characteristics) of the integrated light (24') established by the controller (44) incident upon the bundle proximal end (68) and propagated toward the bundle distal end (70) of the fiber optic hair sample (8) emits visible light from the optical fiber bundle (67) corresponding to the selected hair color (129). The fiber optic hair sample (8) emitting visible light of the selected hair color (129) allows the user (19) to visualize the look and feel of hair of the selected hair color (129).

Now, with primary reference to FIGS. 1 and 22 through 29, in particular embodiments, the setup module (102) can further function to associate the category values (113), analyzed hair color (116), selected hair color (129), calibration data (131), color data (45), RFID data (87) with a user profile (104) or user account (96) which can be stored remotely in the server computer (13) or locally in the client computing device (12). The user profile (104) can be subsequently retrieved from the server computer (13) by the computing device (13) to populate the setup menu (103) with a depiction of the analyzed hair color(s) (116), selected hair color (129) and hair category values (113), and which may then be updated by operation of the program (18) based on subsequent use of the hair color analyzer (2), hair color selector (7), integrated unit (2, 7), or user indications (21) in the setup menu (103).

Now, with primary reference to FIG. 1, in particular embodiments, the server computer (13) or computing device (12) can include or access a hair colorant database (137) including hair colorant constituents (132) used in the hair colorants (11) encompassed by the system (1). The hair colorant database (137) can be updated to add or remove hair colorant constituents (132) used in hair colorants (11) encompassed by the system (1).

Four classes of hair color constituents (132) can be utilized in oxidative hair colorants (11): 1) primary intermediates (133); 2) oxidizing agents (134); 3) couplers (135); and 4) alkalinizing agents (136).

Primary intermediates (133) can be difunctional benzene derivatives capable of being oxidized with resultant development of color, as examples: ortho- and para-phenylenediamines and para-aminophenols. Primary intermediates when oxidized form benzoquinoneimines that are reactive with a color-producing couplers. Suitable primary intermediates for use in the colorants encompassed by the system (1) can include one or more of: o-phenylenediamine, m-phenylenediamine, p-phenylenediamine, 2-chloro-p-phenylenediamine, 2-iodo-p-phenylenediamine, 4-nitro-o-phenylenediamine, 2-nitro-p-phenylenediamine, 1,3,5-triaminobenzene, 2-hydroxy-p-phenylenediamine, 2,4-diaminobenzoic acid, sodium 2,4-diaminobenzoate, calcium di-2,4-diaminobenzoate, ammonium 2,4-diaminobenzoate, trimethylammonium 2,4-, diaminobenzoate, tri-(2-hydroxyethyl)ammonium 2,4-diaminobenzoate, 2,4-diaminobenzaldehyde carbonate, 2,4-diaminobenzensulfonic acid, potassium 2,4-diaminobenzenesulfonate, N,N-diisopropyl-p-phenylenediamine bicarbonate, N,N-dimethyl-p-phenylenediamine, N-ethyl-N'-(2-propenyl)-p-phenylenediamine, N-phenyl-p-phenylenediamine, N-phenyl-N-benzyl-p-phenylenediamine, N-ethyl-N'-(3-ethylphenyl)-p-phenylenediamine, 2,4-toluenediamine, 2-ethyl-p-phenylenediamine, 2-(2-bromoethyl)-p-phenylenediamine, 2-phenyl-p-phenylenediamine laurate, 4-(2,5-diaminophenyl)-benzaldehyde, 2-benzyl-p-phenylenediamine acetate, 2-(4-nitrobenzyl)-p-phenylenediamine, 2-(4-methylphenyl)-p-phenylenediamine, 2-(2,5-diaminophenyl)-5-methylbenzoic acid, methoxyparaphenylenediamine, dimethyl-p-phenylenediamine, 2,5-dimethylparaphenylene-diamine, 2-methyl-5-methoxy-para-phenylenediamine, 2,6-methyl-5-methoxy-para-phenylenediamine, 3-methyl-4-amino-N,N-diethylaniline, N,N-bis(3-hydroxyethyl)-para-phenylenediamine, 3-methyl-4-amino-N,N-bis(3-hydroxyethyl)aniline, 3-chloro-4-amino-N,N-bis(hydroxyethyl)aniline, 4-amino-N-ethyl-N-(carbamethyl)aniline, 3-methyl-4-amino-N-ethyl-N-(carbamethyl)aniline, 4-amino-N-ethyl-(3-piperidonoethyl)aniline, 3-methyl-4-amino-N-ethyl-(piperidonoethyl)aniline, 4-amino-N-ethyl-N-(morpholinoethyl)aniline, 3-methyl-4-amino-N-ethyl-N-(3-mopholinoethyl)aniline, 4-amino-N-ethyl-N-(acetylaminoethyl)aniline, 4-amino-N-(methoxyethyl)aniline, 3-methyl-4-amino-N-ethyl-N-(acetylaminoethyl)aniline, 4-amino-N-ethyl-N-(J-mesylaminoethyl)aniline, 3-methyl-4-amino-N-ethyl-N-(3-mesylaminoethyl)aniline, 4-amino-N-ethyl-N-(sulphoethyl)aniline, 3-methyl-4-amino-N-ethyl-N-(sulphoethyl)aniline, N-(4-aminophenyl)-morpholine, N-(4-aminophenyl)piperidine, 2,3-dimethyl-p-phenylenediamine, isopropyl-p-phenylenediamine, N,N-bis-(2-hydroxyethyl)-p-phenylenediamine sulphate, o-aminophenol, m-aminophenol, p-aminophenol, 2-iodo-p-aminophenol, 2-nitro-p-aminophenol, 3,4-dihydroxyaniline, 3,4-diaminophenol chloroacetate, 2-hydroxy-4-aminobenzoic acid, 2-hydroxy-4-aminobenzaldehyde, 3-amino-4-hydroxybenzenesulfonic acid, N,N-diisopropyl-p-aminophenol, N-methyl-N-(1-propenyl)-p-aminophenol, N-phenyl-N-benzyl-p-aminophenol sulphate, N-methyl-N-(3-ethylphenyl)-p-aminophenol, 2-nitro-5-ethyl-p-aminophenol, 2-nitro-5-(2-bromoethyl)-p-aminophenol, (2-hydroxy-5-aminophenyl)acetaldehyde, 2-methyl-p-aminophenol, (2-hydroxy-5-aminophenyl)acetic acid, 3-(2-hydroxy-5-aminophenyl)-1-propene, 3-(2-hydroxy-5-aminophenyl)-2-chloro-1-propene, 2-phenyl-p-aminophenol palmitate, 2-(4-nitrophenyl)-p-aminophenol, 2-benzyl-p-aminophenol, 2-(4-chlorobenzyl-p-aminophenol perchlorate, 2-(4-methylphenyl)-p-aminophenol, 2-(2-amino-4-methylphenyl)-p-aminophenol, p-methoxyaniline, 2-bromoethyl-4-aminophenyl ether phosphate, 2-nitroethyl-4-aminophenyl ether bromide, 2-aminoethyl-4-aminophenyl ether, 2-hydroxyethyl-4-aminophenyl ether, (4-aminophenoxy)acetaldehyde, (4-aminophenoxy)acetic acid, (4-aminophenoxy)methanesulfonic acid, 1-propenyl-4-aminophenyl ether isobutyrate, (2-chloro)-1-propenyl-4-aminophenyl ether, (2-nitro)-1-propenyl-4-aminophenyl ether, (2-amino)-propenyl-4-aminophenyl ether, (2-hydroxy)-1-propenyl-4-aminophenyl ether, N-methyl-p-aminophenol, 3-methyl-4-aminophenol, 2-chloro-4-aminophenol, 3-chloro-4-aminophenol, 2,6-dimethyl-4-aminophenol, 3,5-dimethyl-4-aminophenol, 2,3-dimethyl-4-aminophenol, 2,5-dimethyl-4- aminophenol, 2-hydroxymethyl-4-aminophenol, 3-hydroxymethyl-4-aminophenol, 2,6-dichloro-4-aminophenol, 2,6-dibromo-4-aminophenol, and 2-bromo-4-aminophenol.

Oxidizing agents (134), typically hydrogen peroxide, although persalts of various acids or solid organic peroxide adducts may be utilized, are responsible for oxidation of the primary intermediates (133) to form benzoquinoneimines. Oxidizing agents (134) can also lighten the natural pigments present in a hair sample (4), the melanins, eumelanins, and pheonelanins.

Couplers (135) contain a strong electron donating group which by reaction with electrophilic benzoquinoneimines form the color of the hair colorant (11). Thus, any aromatic compound having an amino or hydroxy group and an unblocked para position can react with a benzoquinoneimine to produce the color of the hair colorant (11). However, anilines and most monohydric phenols are usually insufficiently reactive to compete with the self-coupling reactions of the primary intermediates (133) under hair dyeing conditions. For this reason, couplers (135) are phenols or anilines bearing a second strong electron donor in the meta position. Suitable primary intermediates for use in the colorants encompassed by the system (1) can include one or more of: 5-amino-2-[(dimethylamino)methyl]phenol, 5-amino-2-{[bis(2-hydroxyethyl)amino]methyl}phenol, 5-amino-2-(morpholinomethyl)phenol, 5-amino-2-(pyrrolidinomethyl)phenol, 5-amino-2-(aminomethyl)phenol, 5-dimethylamino-2-[(dimethylamino)methyl]phenol, 5-dimethylamino-2-(pyrrolidinomethyl)phenol, 5-acetamido-2-[(dimethylamino)methyl]phenol, m-phenylenediamines, such as 2,4-diaminoanisole and 2,4-diaminophenoxyethanol, other m-aminophenols, such as m-aminophenol, 5-amino-2-methylphenol, 5-(N-2-hydroxyethylamino)-2-methylphenol, 2-methyl-5-carbamylmethylaminophenol, and 5-amino-2,6-dimethylphenol, m-acetamidophenols, such as 5-acetamido-2-methylphenol, m-ureidophenols, resorcinols, and heterocyclic couplers, such as 6-hydroxybenzomorpholine, 2,6-diaminopyrridine, and 1-phenyl-3-methylpyrazolone, m-phenylenediamine, m-aminophenol, m-dihydroxybenzene, resorcinol, 4-chlororesorcinol, 2-methylresorcinol, alpha-naphthol, dihydroxynaphthalene, p-nitro-o-phenylenediamine, 4-amino-3-nitrophenol, and 6-chloro-4-vitro-2-aminophenol and their acid, especially hydrochloride salts.

Colorant-forming reactions are carried out at alkaline pH and alkalinizing agents (136) can included in the hair colorant (11). Typically, the alkalinizing agent (136) comprises ammonia; however, suitable alkalizing agents (136) for use in hair colorants (11) encompassed by the system (1) can include one or more of: ammonia; alkyl amines, such as ethylamine and tri-ethylamine; alkanolamines, such as mono-, di-, and tri-ethanolamine; ammonia derivatives; hydroxides of sodium or potassium; carbonates of sodium or potassium; ammonium hydroxide; ethylamine; dipropylamine; triethylamine; alkanediamines, such as 1,3-diaminopropane; anhydrous alkaline alkanolamines, such as mono- or di-ethanolamine, preferably those which are completely substituted on the amine group, such as dimethylaminoethanol; polyalkylene polyamines, such as diethylenetriamine; heterocyclic amines, such as morpholine; hydroxides of alkali metals, such as sodium and potassium hydroxide; hydroxides of alkali earth metals, such as magnesium and calcium hydroxide; basic amino acids such as L-arginine, lysine, oxy-lysine and histidine; and compounds that form $HCO_3$ by dissociation in water including: $Na_2CO_3$, $NaHCO_3$, $K_2CO_3$, $KHCO_3$, $(NH_4)_2CO_3$, $NH4HCO3$, $CaCO_3$ and $Ca(HCO_3-)_2$.

Hair colorants (11) encompassed by the system (1) can further include one or more adjuvants such as fragrances, antioxidants (such as: sodium sulfite and sodium thioglycolate), and sequestering agents such as EDTA, stabilizing agents such as salicylic acid), emulsifiers, surfactants and waxes, oils and quaternary conditioners depending on the product type.

Generally, the coupler (135) to primary intermediate (133) molar ratio can be from about 0.1:1 to about 10:1, preferably from about 1:1 to about 4:1. To obtain the selected hair color (129), the hair colorant (11) can contain one or more primary intermediates (133), and can contain one or more couplers (135). This combination can then be admixed with one or more oxidizing agents (134), typically hydrogen peroxide, 10 vol (3% hydrogen peroxide), 20 vol (6% hydrogen peroxide), 30 vol (9% hydrogen peroxide) or 40 vol (12% hydrogen peroxide) and adjusted by addition of one more alkalinizing agents (136) to a pH of between about 7.0 to about 11.0. Upon mixing with the oxidizing agent (134), the primary intermediate(s)(133) can be oxidized and thereafter react with the coupler(s) (135) at alkaline pH to provide the hair colorant (11). After mixing, the hair colorant (11) can be applied to the hair (22) from about 5 minutes to about 60 minutes, more typically, between about 20 minutes and about 45 minutes.

A prominent concern in coloring hair (22) can be that the color (5) of the hair colorant (11) obtained by mere admixture of the primary intermediates (133) and the couplers (135) under oxidative conditions at suitable pH may not necessarily be same as the resulting hair color (138) obtained when used to actually color the hair (22). The proportions and amounts of the several hair colorant constituents (132) in the hair colorant (11) will depend on various hair colorant factors including one or more of: 1) the analyzed hair color (116) determined by the hair color analyzer (2) and depicted by the analyzed hair color icon (115) in the setup menu (103); 2) the selected hair color (129) through user indications (20) in the color space representation (118) depicted in the setup menu (103) and by the selected hair color icon (128); 3) the hair category values (113) entered by user indications (20) into the hair categories (105) depicted in the setup menu (103) other hair colorant constituents (132) used in or with the hair colorant (11).

In particular embodiments, the program (18) utilizes a set of rules (139) that determines an output hair colorant formula (140). The program (18) can be configured with a set of rules (139) that have a correspondence between the analyzed hair color (116) of a hair sample (4) determined by the hair color analyzer (2) and a ratio of the underlying pigments (141) in the analyzed hair sample (4) that express the analyzed hair color (116); and between the ratio of the underlying pigments (141) in the hair sample (4) and a ratio of primary intermediates (133) and a ratio of couplers (135) in the hair colorant (11) which when combined with the ratio of underlying pigments (141) in the hair (22) will generate the selected hair color (129) depicted by the selected hair color icon (128) in the graphical user interface (21).

The ratio of underlying pigments (141) determined by correspondence to analyzed hair color (116) determined by the hair color analyzer (2) can be due to natural color of the hair sample (4) (whether the hair sample (4) does not contain prior applied hair colorant (11) or because the hair colorant (11) in the hair (22) has been removed by a hair colorant (11) removal product) or due to hair colorant (11) in the hair (22).

A substantial advantage of using the inventive hair color analyzer (2) can be that the analyzed hair color (116) of the hair sample (4) can be determined by the color attributes (28) of the reflected light (24") in context of a continuous visible spectrum (VS) of emitted light (24) which can be then be converted by operation of the program (18) to an analyzed hair color (116) in a corresponding continuous range of colors (5) in a color space (6), or an analyzed hair color (116) in a finely incremented range of colors (5) in a color space (6). The analyzed hair color (116) can be made by the hair color analyzer (2) with an accuracy or precision that cannot be accomplished by the unaided eye or by matching in the conventional hair color level system or international color chart. Accordingly, by operation of the set of rules (139) of the program (18), the analyzed hair color (116) can be correlated to a ratio of underlying pigments (141) that more closely express the analyzed hair color (116) in a hair sample (4). The determined ratio of underlying pigments (141) can be made with an accuracy or precision that cannot be accomplished by manual matching of the analyzed hair color (116) to conventional color charts or color wheels to identify the underlying pigments (141) contained in the hair sample (4).

Similarly, the program (18) can further operate under the set of rules (139) to correlate the ratio of underlying pigments (141) in an analyzed hair sample (116) to a ratio of primary intermediates (133) and a ratio of couplers (135) which can react to develop color in a hair colorant (11), that in combination with the ratio of underlying pigments (141) in the analyzed hair sample (4), affords the selected hair color (129) prior selected by the user (19) in the color space representation (118) depicted in the graphical user interface (21).

Similarly, in particular embodiments, the program (18) can further operate under the set of rules (139) to determine a level of difference (142) between the analyzed hair color (116) and the selected hair color (129). In the conventional "level system," level 1 hair color means black and level 10 hair color means the absence of all pigments. If the hair sample (4) equated to level 5 and the selected hair color is a level 8, then it is said to have 3 levels of lift. In the instant inventive system (1), the level of difference between the analyzed hair color (116) of the hair sample (4) and the selected hair color (129) can be determined based on comparison of the analyzed color (116) and the selected hair color (129) to a continuous spectrum of color (5) in the color space (6). The program (18) can correlate the level of difference (142) to the concentration of the oxidizing agent (134) in the admixture of the primary intermediates (133) and the couplers (135) in the hair colorant (11). In the first instance, the concentration of the oxidizing agent (134) must be sufficient to oxidize the primary intermediates (133) to allow reaction with the couplers (135) in the hair colorant (11). In the second instance, the concentration of the oxidizing agent (134) may be used to open the hair cuticle to allow the hair colorant (11) to penetrate deeper into the hair (22). In the third instance, the concentration of oxidizing agent (134) can remove underlying pigments (141) in the hair (22) which results a lighter selected hair color (129).

A substantial advantage to the using the inventive hair color analyzer (2) and hair color selector (7)(or integrated unit (2, 7) can be that the level of difference (142) between the analyzed hair color (116) and the selected hair color (129) can be determined with greater accuracy or precision which allows greater accuracy or precision in the determined concentration of oxidizing agent (134) to be admixed to the primary intermediates (133) and couplers (135). In particular embodiments, the program (18) can further correlate the hair porosity (110) or the hair thickness (108)(or both) entered into the setup menu (103) with the level of difference (142) between the analyzed hair color (116) and the selected hair color (129), to increase or decrease the concentration of the oxidizing agent (134) in the hair colorant (11).

Similarly, the program (18) can operate to determine a concentration of an alkalinizing agent (136) in the hair colorant (11), in the first instance, to achieve a neutral or alkaline pH (typically between 7.0 pH and 11.0 pH) of the hair colorant (11). In a second instance, the determined concentration of the alkalinizing agent (136) can be adjusted to swell the hair (22) sufficiently to achieve greater penetration of the hair colorant (11), and in the third instance, the determined concentration can be adjusted to assist the oxidizing agent (134) in swelling the hair (22) to allow removal of the underlying hair pigments (141) in the hair (22) to lighten the hair.

Accordingly, the program (18) follows a set of rules (139) which correlates the analyzed hair color (116) and the selected hair color (129) to determine the concentration of the particular primary intermediates (133), couplers (135) and oxidizing agent (134) in the volume of the admixture of the hair colorant (11) and the corresponding amount of a particular alkalinizing agent (136) required to achieve a neutral or alkaline pH of the volume of the hair colorant (11). The program (18) can then correlate the level of difference (142) between the analyzed hair color (116) and the selected hair color (129) to adjust the concentration of alkalinizing agent (141) in the hair colorant (11) depending upon whether the level of difference (142) comprises a small or large level of difference. The program (18) can also correlate the concentration of the alkalinizing agent (136) in the hair colorant (11) to the hair thickness (108) or hair porosity (110) (or both) entered by the user (19) into the setup menu (103).

The correlations made by the program (18) can then be further processed to produce a hair colorant formula (140). The hair colorant formula (140) can be further associated with computer implementable instructions which can be matched with the individual hair color constituents (132) (whether as raw materials such as particular primary intermediates (133); oxidizing agents (134); couplers (135), alkalinizing agents (136), or a manufacturer's standardized component) and the amount of each of the hair colorant constituents (132) in a hair colorant (11) (whether by volume or weight, or both). The program (18) can function to depict the hair colorant formula (140) in the graphical user interface (21) (as shown in the example of FIG. 22). The hair color constituents (132) can, but need not necessarily, be combined manually by the user (19) or the hair colorant formula (140) can be delivered to a colorant mixer (10).

Now with primary reference to FIGS. 1 and 33, in particular embodiments, the system (1) can further comprise a colorant mixer (10) including one or more of: a hair colorant mixer controller (143), a hair colorant mixer electronic data exchanger (144) and a hair colorant mixer display surface (145). The hair colorant mixer (10) can, but need not necessarily, be communicatively coupled to the server computer (13) or a computing device (12) to receive the hair colorant formula (140) generated by operation of the program (18), or a user (19) can by user indications (20) enter the hair colorant formula (140) into a hair colorant mixer user interface (146) depicted on the hair colorant mixer display surface (145).

The colorant mixer (10) can store the hair colorant formula (140) in a colorant mixer non-transitory media (147) and by further operation of the colorant mixer controller (143) process the hair colorant formula (140) and correspondingly control the colorant mixer (10), based on the hair colorant formula (140), to mete out or apportion by measure the hair colorant constituents (132) of the hair colorant (11), including one or more of the primary intermediates (133); oxidizing agents (134); couplers (135), alkalinizing agents (136), or other constituents (132) of the hair colorant (11) which can be combined to afford a hair colorant (11) useful to dye the hair (22) having the analyzed hair color (116) to achieve the selected hair color (129) depicted by the selection hair color icon (128) in the setup menu (103).

Embodiments of the colorant mixer (10) can include a plurality of vessels (148) each having a configuration suitable to contain a hair colorant constituent (132), such as particular primary intermediates (133); oxidizing agents (134); couplers (135), alkalinizing agents (136), or a manufacturer's standardized component, or other constituents (132), or combinations thereof. Each of the plurality of vessels (148) can be connected to a conduit (149) defining a flow path between one or more of the plurality of vessels (148) and a collection container (150). In particular embodiments, each of the plurality of vessels (148) can be connected to the collection container (150) by a discrete conduit (149), while in other embodiments, a furcated conduit portion (151) can connect each of a plurality of vessels (148) to a common conduit portion (152) defining a flow path to the collection container (150). Each of the discrete conduits (149) or each furcated conduit portion (151) can further include a vessel valve (153) switchable between a valve closed condition interrupting delivery of a hair colorant constituent (132) contained the corresponding one of the plurality of vessels (148) through the flow path and an open condition allowing delivery of a hair colorant constituent (132) contained in the corresponding one of the plurality of vessels (148) through the flow path to the collection container (150). As shown in the illustrative example of FIG. 33, the vessel valve (153) can comprise a rotary valve (153'); although other types of vessel valves (153) can be employed which can afford open and closed conditions to configure a flow path from each of the plurality of vessels (148) and the collection container (150).

In particular embodiments, each of the plurality of vessels (148) can be fluidically connected to individual or a common pressure source (154). A hair colorant constituent (132) contained in a vessel (148) can be delivered to the flow path under pressure. As illustrative examples, a gas head pressure (155) can be developed in each vessel (148) (which can be nitrogen or argon to maintain purity of the hair colorant constituent (132)) to exert sufficient force to overcome the counteracting atmospheric pressure in the conduit (149) and generating a flow of the hair colorant constituent (132) from the vessel (148) to the collection container (150), or gas pressure or mechanical pressure can be exerted on an external surface of a flexible vessel reducing the vessel volume sufficiently to generate a flow of the component from the vessel to the collection container, or mechanical pressure can be exerted on the hair colorant constituent by operation of a piston or diaphragm within the vessel reducing vessel volume sufficiently to generate a flow of the hair colorant constituent (132) from the vessel (148) to the collection container (150); however, these illustrative examples of generating flow of a hair colorant constituent (133, 134, 135, 136) from a vessel (148) to a collection container (150) are not intended to preclude other structures or methods of generating a flow of a hair colorant constituent (132) between a vessel (148) and a collection container (150).

In particular embodiments, the color mixer (10) can, but need not necessarily, include a scale (156) responsive to the weight of the collection container (150). The color mixer controller (143), or the program (18) under control of the server (13) or client computer (12), can correlate a change in weight of the collection container (150) due to delivery of a hair colorant constituent (132) to an amount of the hair colorant constituent (132) delivered to the collection container (150). See for example, DE4113454A1 hereby incorporated by reference herein.

In other embodiments, one or more volumetric conduit loops (157), each defining a flow path of known volume, can by operation of corresponding vessel valves (153) and conduit loop valves (158) and waste container valve (158) afford a flow path between a vessel (148) and a waste container (160). One or more of the volumetric conduit loops (157) can be filled with a hair colorant constituent (132, 133, 134, 135, 136) to afford a known volume of the hair colorant constituent (132) within the filled volumetric conduit loops (157). The filled volumetric conduit loop(s) (157), can by operation of the corresponding vessel valve (153) (to the closed condition), operation of the conduit loop valves (158) (to the open condition), and delivery of gas pressure to the filled volumetric conduit loops (157) deliver the measured volume of the hair colorant constituent (132) from the filled volumetric conduit loops (157) to the collection container (150). See as an illustrative example, U.S. Pat. No. 6,813,568 hereby incorporated by reference herein.

Based on the hair color formulation (140) received by the colorant mixer (10), the colorant mixer controller (143) can execute the program (18) to operate the appropriate vessel valves (153), volumetric conduit loop valves (158), waste container valve (159), or other valves to fill one or more of the volumetric conduit loops (157), concurrently or in series, and to deliver a measured volume of each hair colorant constituent (132) to the collection container (150) as required by the hair colorant formula (140) to produce the hair colorant (11) that can be applied to the hair (22) having the analyzed hair color (116) to achieve the selected hair color (129) in the hair (22).

As can be easily understood from the foregoing, the basic concepts of the present invention may be embodied in a variety of ways. The invention involves numerous and varied embodiments of a hair colorant selection and formulation system and methods for making and using such hair colorant selection and formulation system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "hair color analyzer" should be understood to encompass disclosure of the act of "analyzing hair color"—whether explicitly discussed or not—and, conversely, were there effectively disclosure of the act of "analyzing hair color", such a disclosure should be understood to encompass disclosure of a "hair color analyzer" and even a "means for analyzing hair color." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) the hair colorant selection and formulation system herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An apparatus, comprising:
   at least one light emitter which emits visible light;
   a shell having a reflective interior surface extending to a shell outer edge;
   an annular base having an annular base outer edge and an annular base inner edge, said shell outer edge connected to said shell inner edge, said annular base inner edge defining an optical aperture;
   an optical tube having an optical tube first end connected to said annular base about said optical aperture and extending to an optical tube second end, said optical tube configured to deliver said visible light onto a substrate at an angle theta;
   a light receiving tube having a light receiving tube first end coupled to said shell and a second end disposed in said optical tube to receive said visible light when said visible light reflected from said substrate; and
   a first color detector disposed in said light receiving tube to detect said visible light reflected from said substrate.

2. The apparatus of claim 1, further comprising a controller responsive to user actuation to operate said at least one light emitter driver circuit to control emission of said visible light from said at least one light emitter.

3. The apparatus of claim 2, wherein said at least one light emitter emits said visible light having a full spectrum or broad spectrum.

4. The apparatus of claim 3, wherein said controller communicatively coupled to a non-transitory computer readable memory containing a program code executable to convert color data generated by said first color detector to a color in a color space.

5. The apparatus of claim 4, wherein said substrate comprises a hair sample, and wherein said color in said color space comprises an analyzed hair color of said hair sample.

6. The apparatus of claim 5, wherein said program further executable to determine a ratio of underlying pigments in said hair sample based on said analyzed hair color.

7. The apparatus of claim 6, wherein said program further allows selection of a color in said color space, wherein said selection of said color in said color space comprises a selected hair color.

8. The apparatus of claim 7, wherein said program further executable to apply a set of rules based on said analyzed hair color and said selected color to generate a hair colorant formula of a hair colorant which applied to said analyzed hair color results in said selected hair color.

9. The apparatus of claim 8, wherein said program further executable in accordance with said set of rules to correlate said ratio of underlying pigments associated with said analyzed hair color to a ratio of primary intermediates and a ratio of couplers in a hair colorant which upon reaction and in combination with said ratio of underlying pigments associated with said analyzed hair color results in said selected hair color.

10. The apparatus of claim 9, wherein said program further executable in accordance with said set of rules to determine a level of difference between said analyzed hair color and said selected hair color.

11. The apparatus of claim 10, wherein said program further executable in accordance with said set of rules to correlate said level of difference to a concentration of an oxidizing agent to admix with said ratio of primary intermediates and said ratio of couplers in said hair colorant.

12. The apparatus of claim 11, wherein said program further executable to in accordance with said set of rules to determine a concentration of an alkalinizing agent in said hair colorant containing said concentration of said oxidizing agent and said ratio of primary intermediates and said ratio of couplers to achieve a neutral or alkaline pH of said hair colorant.

13. The apparatus of claim 12, wherein said program further executable in accordance with said rules to determine said concentration of said alkalinizing agent in said hair colorant to alter a penetration level of said hair colorant in said hair.

14. The apparatus of claim 13, wherein said program further executable in accordance with said set of rules to determine said concentration of said alkalinizing agent in said hair colorant to achieve a hair pigment removal level of said underlying hair pigments from said hair.

15. The apparatus of claim 14, wherein said program further executable to match said hair colorant formula to an amount of each of said primary intermediates, said couplers, said oxidizing agent or said alkalinizing agents, and combinations thereof.

16. The apparatus of claim 2, wherein said at least one light emitter comprises a plurality of light emitters each driven by one of a plurality of light emitter driver circuits, said plurality of light emitters individually or in combination configured to be driven over a range of wavelength frequencies encompassing substantially the entire visible spectrum.

17. The apparatus of claim 2, wherein said plurality of light emitters configured to emit light having a color selected by a user in a color space encompassing a portion of or substantially the entire visible spectrum.

18. The apparatus of claim 17, wherein said controller is communicatively coupled to a non-transitory memory containing a program code executable to convert said color selected by said user in said color space to color data, said controller responsive to said color data to drive said plurality of light emitters to emit light corresponding to said color selected by said user in said color space.

19. The apparatus of claim 18, further comprising a second color detector which detects light reflected from said reflective interior surface of said shell, said second color detector generates color data convertible by said program to a color in a color space.

* * * * *